United States Patent
Warren et al.

(10) Patent No.: US 11,650,608 B2
(45) Date of Patent: May 16, 2023

(54) TIMING FOR POWER-STEALING CIRCUITS IN SMART-HOME DEVICES

(71) Applicant: Google LLC, Mountain View, CA (US)

(72) Inventors: Daniel Adam Warren, San Francisco, CA (US); Michael Mitchell, San Francisco, CA (US)

(73) Assignee: Google LLC, Mountain View, CA (US)

( * ) Notice: Subject to any disclaimer, the term of this patent is extended or adjusted under 35 U.S.C. 154(b) by 327 days.

(21) Appl. No.: 17/006,787

(22) Filed: Aug. 29, 2020

(65) Prior Publication Data

US 2022/0066485 A1 Mar. 3, 2022

(51) Int. Cl.

| | |
|---|---|
| *G05D 23/32* | (2006.01) |
| *F24F 11/64* | (2018.01) |
| *F24F 11/65* | (2018.01) |
| *G05D 23/19* | (2006.01) |
| *F24F 11/46* | (2018.01) |
| *H02M 1/08* | (2006.01) |

(52) U.S. Cl.
CPC ............. *G05D 23/32* (2013.01); *F24F 11/46* (2018.01); *F24F 11/64* (2018.01); *F24F 11/65* (2018.01); *G05D 23/1917* (2013.01); *H02M 1/081* (2013.01)

(58) Field of Classification Search
CPC . F24F 11/46; F24F 11/64; F24F 11/65; G05D 23/32; G05D 23/1917; H02M 1/083; H02M 3/156; H02M 1/081
See application file for complete search history.

(56) References Cited

U.S. PATENT DOCUMENTS

| | | | |
|---|---|---|---|
| 6,490,174 B1 * | 12/2002 | Kompelien | H02M 5/293 363/16 |
| 8,600,561 B1 | 12/2013 | Modi et al. | |
| 8,627,127 B2 | 1/2014 | Mucignat et al. | |
| 9,791,871 B1 | 10/2017 | Marschalkowski et al. | |
| 10,557,640 B2 | 2/2020 | Warren et al. | |
| 2013/0204440 A1 | 8/2013 | Fadell et al. | |
| 2013/0221117 A1 | 8/2013 | Warren et al. | |
| 2014/0000858 A1 | 1/2014 | Frank | |
| 2014/0312131 A1 * | 10/2014 | Tousignant | H03K 17/16 236/1 C |
| 2014/0368036 A1 * | 12/2014 | Houde | H02M 1/08 307/31 |
| 2016/0334812 A1 | 11/2016 | Zikes et al. | |

(Continued)

*Primary Examiner* — Marc E Norman
(74) *Attorney, Agent, or Firm* — Kilpatrick Townsend & Stockton LLP

(57) ABSTRACT

A smart-home device may include an energy-storage element that stores energy harvested from an environmental system; a power wire connector and a return wire connector; and switching elements configured to operate in a first state where the switching elements create a connection between the power and the return; and a second state where the switching elements interrupt the connection between the power and return. The smart-home device may also include a circuit that controls the switching elements, where the circuit is configured to detect a zero-crossing of a current received through the power wire connector; wait for a first time interval after the zero-crossing is detected; after an expiration of the first time interval, enable active power stealing for a second time interval; and after an expiration of the second time interval, disable active power stealing.

20 Claims, 21 Drawing Sheets

(56) References Cited

U.S. PATENT DOCUMENTS

2019/0011940 A1\* 1/2019 Fernandez .............. H02P 27/04
2019/0056131 A1    2/2019 Warren et al.
2020/0177075 A1\* 6/2020 Champagne ............ H02M 1/08

\* cited by examiner

TIMING FOR POWER-STEALING CIRCUITS IN SMART-HOME DEVICES

TECHNICAL FIELD

This patent specification relates to systems, methods, and related computer program products for powering controllers for energy-consuming systems or other resource-consuming systems. More particularly, this specification relates to input selection and switch timing for power-stealing circuits in smart-home devices, such as thermostats.

BACKGROUND

Early thermostats used a bimetallic strip to sense temperature and respond to temperature changes in the room. The movement of the bimetallic strip was used to directly open and close an electrical circuit. Power was delivered to an electromechanical actuator, usually relay or contactor in the HVAC equipment whenever the contact was closed to provide heating and/or cooling to the controlled space. Since these thermostats did not require electrical power to operate, the wiring connections were very simple. Only one wire connected to the transformer and another wire connected to the load. Typically, a 24 VAC power supply transformer, the thermostat, and 24 VAC HVAC equipment relay were all connected in a loop with each device having only two required external connections.

When electronics began to be used in thermostats, the fact that the thermostat was not directly wired to both sides of the transformer for its power source created a problem. This meant that the thermostat had to be hardwired directly from the system transformer. Direct hardwiring a common "C" wire from the transformer to the electronic thermostat may be very difficult and costly.

Because many households do not have a direct wire from the system transformer (such as a "C" wire), some thermostats have been designed to derive power from the transformer through the equipment load. The methods for powering an electronic thermostat from the transformer with a single direct wire connection to the transformer are called "power stealing" or "power sharing" methods. The thermostat "steals," "shares," or "harvests" its power during the "OFF" periods of the heating or cooling system by allowing a small amount of current to flow through it into the load coil below the load coil's response threshold (even at maximum transformer output voltage). During the "ON" periods of the heating or cooling system the thermostat draws power by allowing a small voltage drop across itself. Ideally, the voltage drop will not cause the load coil to dropout below its response threshold (even at minimum transformer output voltage).

The electronics involved in power stealing may be very complex. These electronics typically must interface between high-current, high-voltage HVAC systems and sensitive low-power electronics on the thermostat. Great care must be taken to prevent interference with the operation of the HVAC system to prevent user discomfort and/or inconvenience. Therefore, the timing of power stealing intervals and the manner in which HVAC call signals are temporarily interrupted requires improvement.

SUMMARY

In some embodiments, a smart-home device may include an energy-storage element that stores energy that is harvested from an environmental system; a power wire connector and a return wire connector; and one or more switching elements configured to operate in a first operating state in which the one or more switching elements create a connection between the power wire connector and the return wire connector, and a second operating state in which the one or more switching elements interrupt the connection between the power wire connector and the return wire connector. The smart-home device may also include a circuit that controls the one or more switching elements, where the circuit is configured to: detect a zero-crossing of a current received through the power wire connector; wait for a first time interval after the zero-crossing is detected; after an expiration of the first time interval, enable active power stealing for a second time interval by allowing the one or more switching elements to transition from operating in the first operating state to the second operating state during the second time interval; and after an expiration of the second time interval, disable active power stealing.

In some embodiments, a method for enabling active power-stealing operations in a smart-home device may include detecting a zero-crossing of a current received through a power wire connector of the smart home device. The method may also include waiting for a first time interval after the zero-crossing is detected. The method may additionally include after an expiration of the first time interval, enabling active power stealing for a second time interval by allowing one or more switching elements to transition from operating in a first operating state to a second operating state during the second time interval. The first operating state may create a connection between the power wire connector and a return wire connector of the smart-home device. The second operating state may interrupt the connection between the power wire connector and the return wire connector. The method may also include disabling active power stealing after an expiration of the second time interval.

In any embodiments, any and/or all of the following features may be implemented in any combination and without limitation. Enabling active power stealing may allow a power-stealing circuit to steal power from the environmental system at times that occurred during the second time interval. At least two different active power-stealing operations may take place during the second time interval. The smart-home device may also include a storage capacitor that may be charged to between approximately 30 V and approximately 40 V during power-stealing operations that take place during the second time interval. The second time interval may be centered around a peak of the current received through the power wire connector. More of the second time interval may occur during a second half of a peak of the current received through the power wire connector than during a first half of the peak of the current received through the power wire connector. The first time interval may be between approximately 2 ms and approximately 6 ms. The second time interval may be between approximately 1 ms and approximately 6 ms. A length of the second time interval may be determined based on an operating current of the smart-home device during the second time interval. The length of the second time interval may be increased as the operating current of the smart-home device increases, and the length of the second time interval may be decreased as the operating current of the smart-home device decreases. The circuit may include a microprocessor. The circuit may include a delay circuit and a windowing circuit. The circuit may include a comparator comprising a first input and a second input that receive voltages before and after passing through the one or more switching elements.

DETAILED DESCRIPTION

A smart thermostat refers to a thermostat that can communicate via a network and allows a user to interact with the smart thermostat from a remote location, such as via a mobile device (e.g., smartphone, tablet computer, desktop computer, laptop computer, etc.). Additionally or alternatively, a smart thermostat has advanced features such as sensing as to whether any persons are in the vicinity of the smart thermostat and adjusting a setpoint temperature of the thermostat based on the sensed occupancy.

When a smart thermostat is installed, such as in a user's home, the user may desire that the smart thermostat be relatively easy to interact with and is also aesthetically pleasing. Embodiments detailed herein are directed to smart thermostats that can include a touch strip that is used by the user to provide input directly to the smart thermostat. In some embodiments, the touch strip is the only user interface present on the smart thermostat. Additionally, the user can interact with the thermostat via an application executed on a mobile device.

The smart thermostat may have a mirrored cover on a face of the thermostat. When the electronic display is turned off, the mirrored cover may have the visual effect of appearing to be a mirror to a user viewing the face of the thermostat. When the electronic display is illuminated, the mirrored cover has a sufficient transmissivity to allow the illuminated portion of the electronic display to be viewed by the user through the cover. In some embodiments, the cover does not have any cutouts, holes, lenses, or variations on the front surface that could be visible to the user.

The smart thermostat may have a radar sensor. The radar sensor may sense the ambient environment of the smart thermostat through the cover. The cover may use one or more ceramic oxide layers to achieve reflectivity rather than using any metallic layers. In some embodiments, no metallic layer is present within the cover. The lack of a metallic layer can help increase the transmissivity for electromagnetic radiation (or radio waves) emitted by the radar sensor and received by the radar sensor through the cover.

Figure 1:
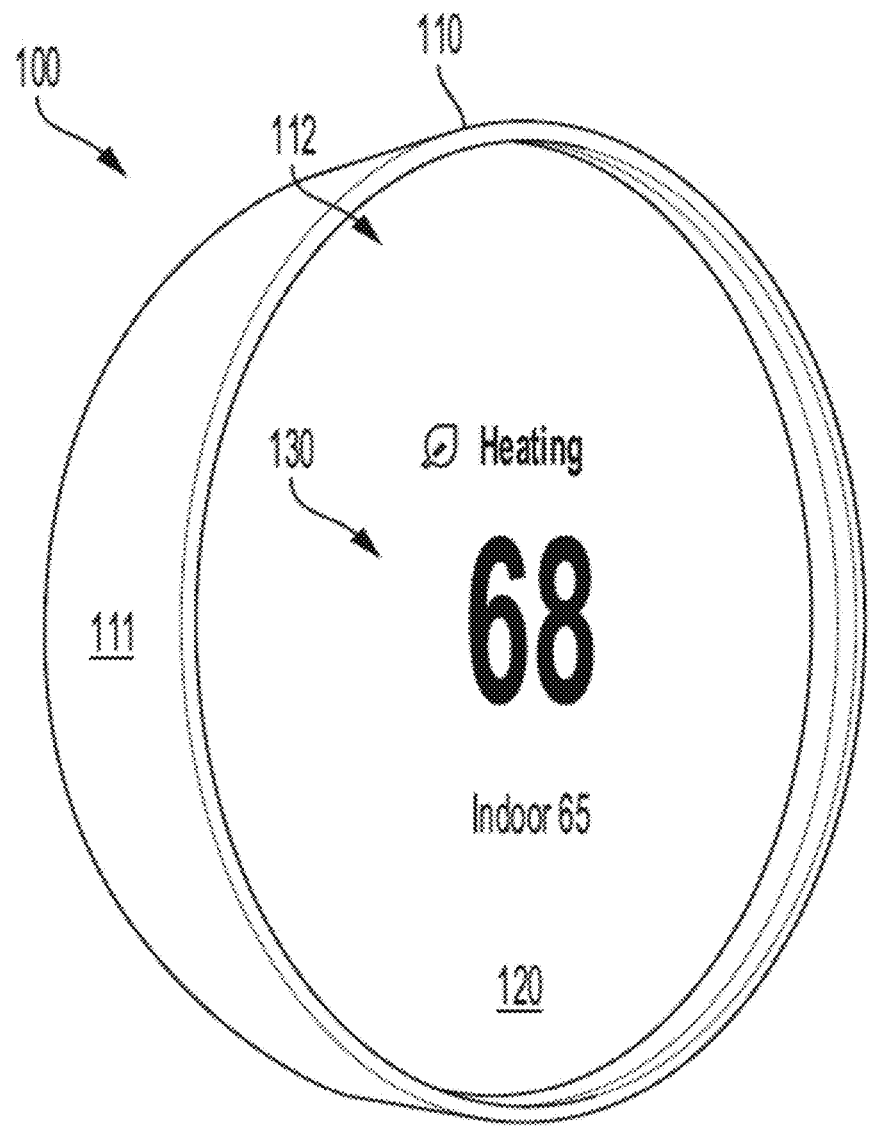
FIG. 1 illustrates a smart thermostat with an electronic display presenting information, according to some embodiments.

Further detail regarding the smart thermostat is provided in relation to the figures. FIG. 1 illustrates a smart thermostat 100 with an electronic display presenting information, according to some embodiments. As visible in FIG. 1, housing 110, cover 120, and a portion of an illuminated electronic display 130 ("display 130") can be seen.

Housing 110 defines rounded aperture 112, such as a circular aperture, in which cover 120 may be attached with housing 110. Housing 110 includes sidewall 111. In the illustrated embodiment, sidewall 111 is generally cylindrical. Around an axis perpendicular to cover 120, a radius of sidewall 111 may be greater at front of housing 110 where cover 120 is housed and smaller toward a back of housing 110.

Cover 120 is housed by housing 110 such that within aperture 112 cover 120 is visible when the front of smart thermostat 100 is viewed. Cover 120 can have a reflectivity such that when display 130 is not illuminated, cover 120 appears to be a mirror when viewed by a user.

Display 130 is housed behind cover 120 such that, when illuminated, the portion of display 130 that is illuminated is visible through cover 120 by a user. In some embodiments, due to the reflectivity of cover 120, an edge of display 130 is not visible to a user regardless of whether display 130 is illuminated, partially illuminated, or not illuminated. Therefore, the overall effect experienced by a user may be that cover 120 appears as a mirror and portions of display 130, when illuminated, are visible through cover 120.

In some embodiments, display 130 is not a touch screen. Therefore, in such embodiments, a user is required to use another user interface to interact with smart thermostat 100.

The user may use an application executed by a mobile device to interact with the thermostat via a wireless network or a direct wireless connection (e.g., Bluetooth). A user interface, such as a capacitive touch strip, may be present on smart thermostat 100. In some embodiments, the capacitive touch strip is the only user interface present on smart thermostat through which a user can interact with presented menus, icons, and other data presented on display 130. Further, in some embodiments, no user interface present on smart thermostat 100 has any moving parts. When smart thermostat 100 is fully installed, no components may be accessible or visible to the user that are movable.

Figure 2:
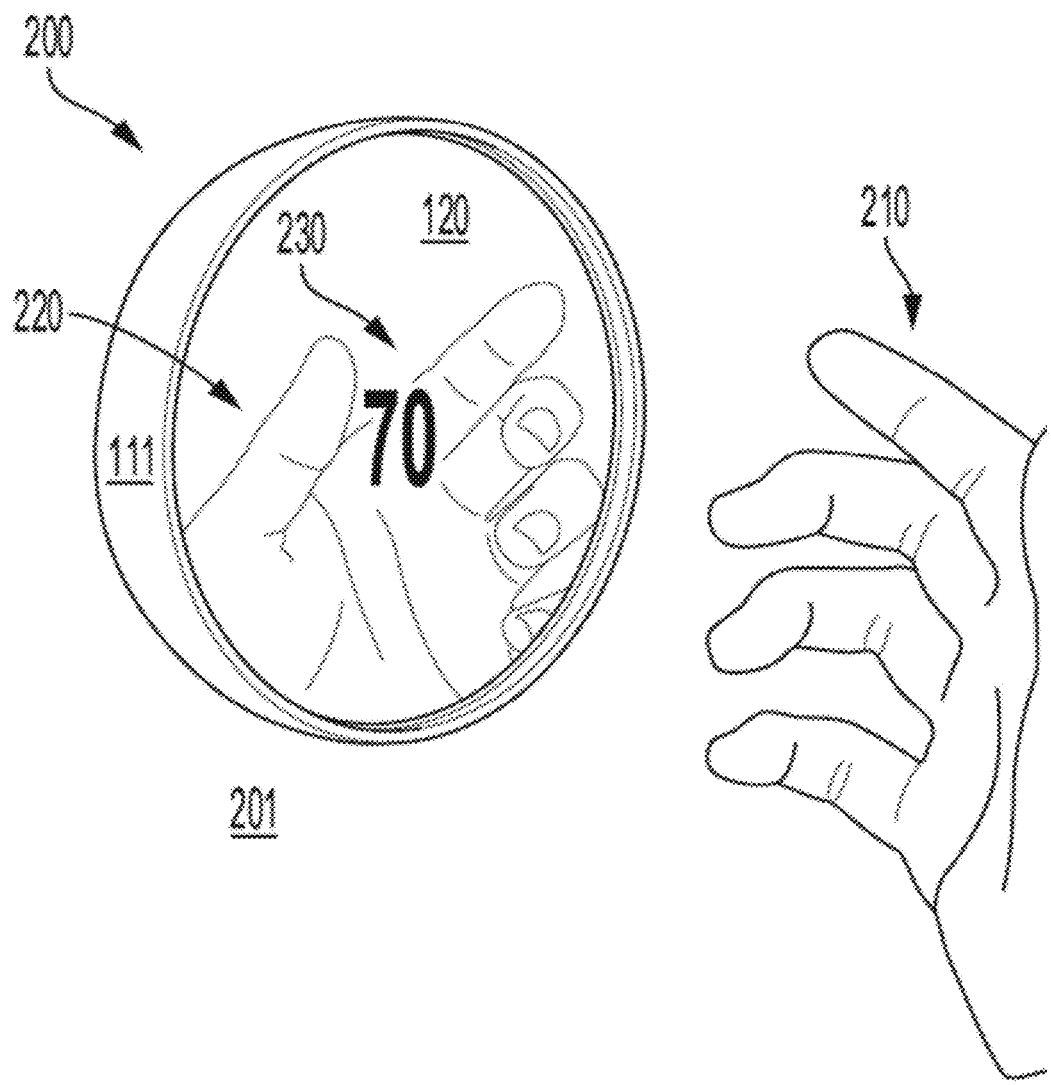
FIG. 2 illustrates a user's hand being present near thermostat that is mounted to a wall, according to some embodiments.

FIG. 2 illustrates a view 200 of a user's hand being present near thermostat 100 that is mounted to wall 201, according to some embodiments. In view 200, cover 120 is sufficiently reflective that a reflection 220 of user's hand 210 is visible. Cover 120 has a sufficient transmissivity that temperature 230, as presented by display 130 through cover 120, is also visible. To calculate transmittance, a perception weighted average can be used. In some embodiments, such as those in which cover 120 appears to have a "silver" tint, transmissivity may be 29%. For other colors, such as when cover 120 has a "rose" or "nickel" tint, transmissivity may be 22% and 18.6% respectively. In other embodiments, transmissivity may be between 15% and 55%. Reflectivity may be between 75% and 40% depending on embodiment.

As can be seen in embodiment 200, except for portions of display 130 that are illuminated, cover 120 appears as an uninterrupted surface with no gaps, holes, lens, or other discontinuities present on cover 120.

Figure 3A:
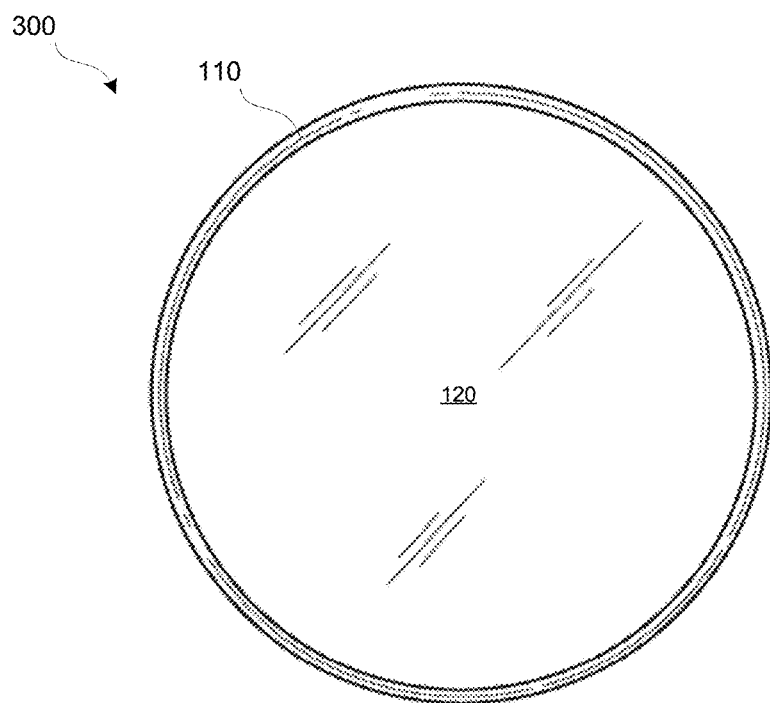
FIG. 3A-3B illustrates a smart thermostat as viewed from the front and the right, according to some embodiments.

FIG. 3A illustrates a smart thermostat 300 as viewed from the front, according to some embodiments. When mounted on a wall or other surface, cover 120 is opposite the portion of thermostat 300 that mounts to the wall or other surface. Therefore, when a user is facing mounted thermostat 300, cover 120 is visible.

Smart thermostat 300 can represent an embodiment of thermostat 100 of FIGS. 1 and 2. Housing 110 can define a rounded aperture in which cover 120 is located. In some embodiments, housing 110 defines a circular aperture in which cover 120 is located. In such embodiments, cover 120 can be circular. As previously detailed, cover 120 can form an uninterrupted surface with no gaps, holes, lens, or other discontinuities present on cover 120. Cover 120 has sufficient transmissivity to allow light emitted by electronic display 130 located within housing 110 to be visible through cover 120. Cover 120 can have sufficient reflectivity such that a mirrored effect is present on portions of cover 120 that are not currently being illuminated from behind by electronic display 130. Notably, in some embodiments, it is not possible for a user to view where an edge of electronic display 130 is through cover 120 due to the reflectivity of cover 120.

Figure 3B:
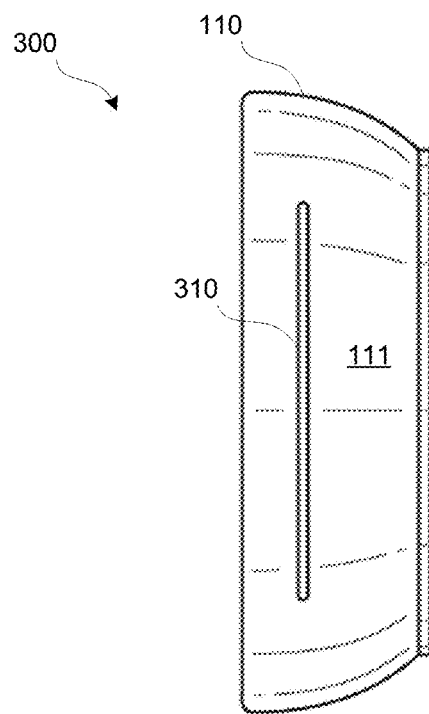

FIG. 3B illustrates a smart thermostat 300 as viewed from the right, according to some embodiments. Thermostat 300 can represent thermostat 100 of FIG. 1. When thermostat 300 is mounted to a wall or other surface, touch strip indicator 310 may be visible on the right side of sidewall 111. Touch strip indicator 310 may be a visible indicator, such as a line, shading, or some form of shape or marking that serves as a visible indicator as to where a user can touch sidewall 111 to provide user input. Within housing 110, on an inner side of the sidewall opposite touch strip indicator 310, can be a touch strip that can detect one or more types of gestures performed by a user on or near touch strip indicator 310. For example, a user can perform a tap gesture (touch and release), a swipe gesture (e.g., swipe upward along touch strip indicator 310, swipe downward along touch strip indicator 310), or a long hold gesture (touch and hold for at least a threshold amount of time).

The touch strip may be capacitive and, through sidewall 111 of housing 110, a user's touch against sidewall 111 can be detected. Touch strip indicator 310 may serve to indicate to a user the region in which the user's touch is sensed. Any gesture performed significantly away from touch strip indicator 310 may be unlikely to be sensed by the touch strip. The touch strip located within housing 110 may represent the only user input component present on thermostat 300 through which a user can directly provide input to thermostat 300. Additionally, a user may use an application or website executed on another computerized device to interact with thermostat 300.

The tactile sensation when a user moves his finger over touch strip indicator 310 might be no different than sidewall 111. Alternatively, touch strip indicator 310 may have a variance in protrusion or texture from sidewall 111 so that a user can determine the location of touch strip indicator 310 by touch. For instance, a multi-layer (e.g., 4 layer) pad print may be performed to create touch strip indicator 310 such that a subtle protrusion of touch strip indicator 310 is present. Such an arrangement may be beneficial when interacting with thermostat 300 in a darkened environment.

In the embodiment of thermostat 300, touch strip indicator 310 and the corresponding touch strip are located on a right side of thermostat 300 when viewed from the front (such as seen in FIG. 3). In other embodiments, the touch strip and corresponding touch strip indicator 310 may be present on a top, bottom, or left of sidewall 111. In some embodiments, multiple touch strips may be present, such as on the left and right of sidewall 111.

Figure 4:
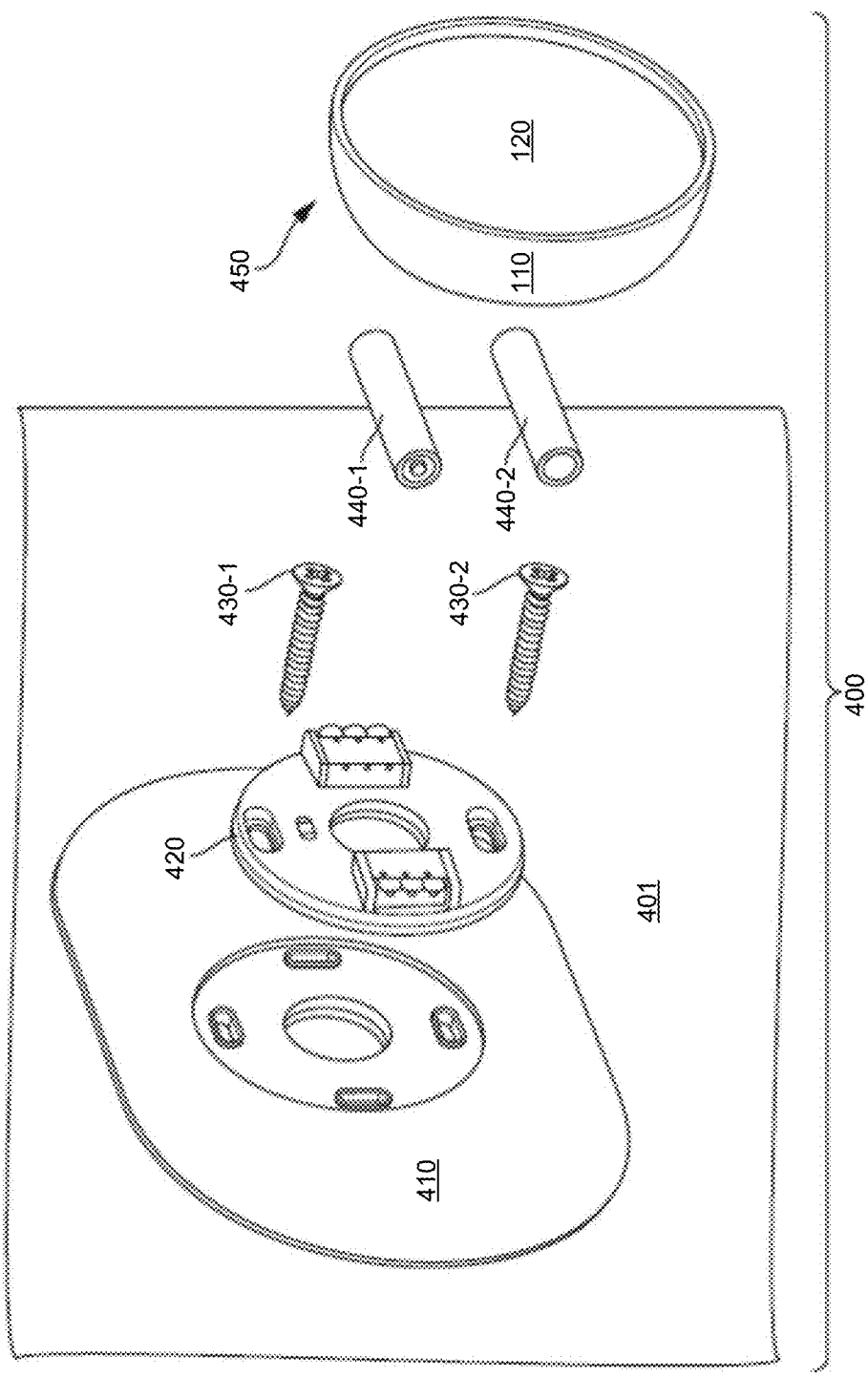
FIG. 4 illustrates a thermostat mounting system, according to some embodiments.

FIG. 4 illustrates a thermostat mounting system 400, according to some embodiments. Thermostat mounting system 400 can include: trim plate 410; backplate 420; fasteners 430; batteries 440; and thermostat 450. Thermostat 450 can represent an embodiment of thermostat 100 of FIG. 1 and the other thermostat embodiments detailed herein. Trim plate 410 may be plastic, wooden, or metallic plate that defines several holes to accommodate fasteners 430 and allow HVAC (heating, ventilation, and air conditioning) control wires to pass through. Trim plate 410 may serve to conceal any unsightly holes present in wall 401, such as where previous drilling occurred, electrical boxes, paint mismatches, or other aesthetic variances.

Backplate 420 may include multiple receptacles, with each receptacle designated to receive a particular HVAC control wire. Backplate 420 can define one or more holes configured to receive fasteners 430. Fasteners 430 can secure backplate 420 and, if being used, trim plate 410, to a surface, such as a wall.

In some embodiments, two fasteners, fastener 430-1 and fastener 430-2 may be presented. Fasteners 430 may be screws, nails, or some other form of fastener. Fasteners 430 can securely hold backplate 420 and, possibly, trim plate 410 to a surface, such as a wall. Thermostat 450 may removably attach with backplate 420. A user may be able to attach thermostat 450 to backplate 420 by pushing thermostat 450 against backplate 420. Similarly, a user can remove thermostat 450 from backplate 420 by pulling thermostat 450 away from backplate 420. When thermostat 450 is connected with backplate 420, electrical connections between thermostat 450 and HVAC control wires that have been connected with the receptacles of backplate 420.

In some embodiments, HVAC control wires can include a "C" wire, which stands for common wire. The C wire delivers power, such as in the form of 24 V AC, to thermostat 450. Thermostat 450, being connected with a C wire (and, possibly an "R" wire, which is typically red), can have access to a power supply that does not need to be periodically replaced or recharged, such as batteries 440. In some embodiments, if a C wire is not present, thermostat 450 can function using batteries 440 as its exclusive power source.

Batteries 440, which can include one or more batteries, such as battery 440-1 and battery 440-2, can serve as a primary power source or as a backup power source. In some embodiments, one or more features of thermostat 450 can be disabled if only batteries 440 are available as a power supply. Batteries 440 may be replaceable by a user. Batteries 440 may be rechargeable.

Figure 5:
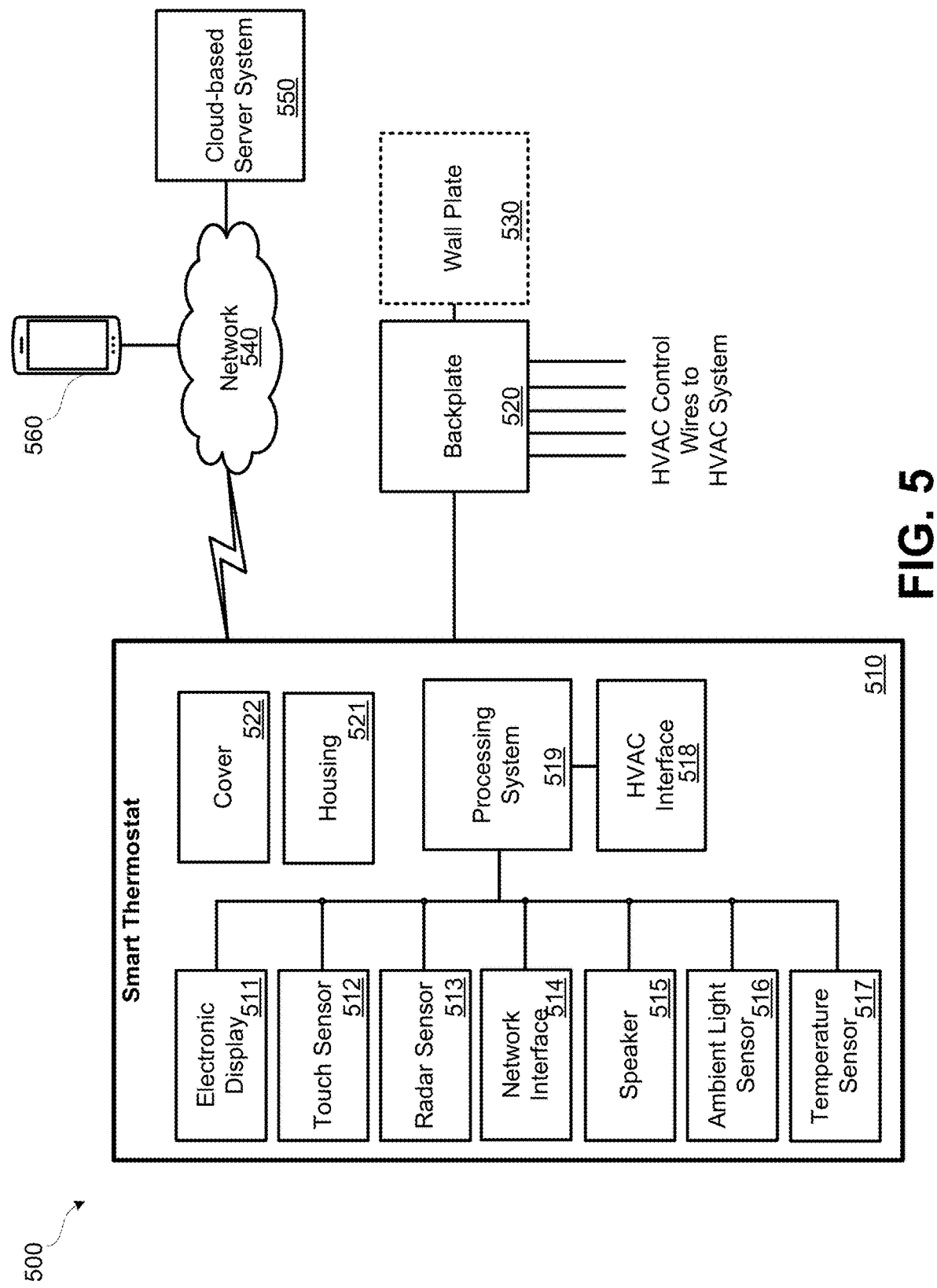
FIG. 5 illustrates a smart thermostat system, according to some embodiments.

FIG. 5 illustrates a smart thermostat system 500, according to some embodiments. Smart thermostat system 500 can include smart thermostat 510; backplate 520; trim plate 530; network 540; cloud-based server system 550; and computerized device 560. Smart thermostat 510 can represent any of the thermostats detailed in relation to FIGS. 1-4. Thermostat 510 can include: electronic display 511; touch sensor 512; radar sensor 513; network interface 514; speaker 515; ambient light sensor 516; temperature sensor 517; HVAC interface 518; processing system 519; housing 521; and cover 522.

Electronic display 511 may be visible through cover 522. In some embodiments, electronic display 511 is only visible when electronic display 511 is illuminated. In some embodiments, electronic display 511 is not a touch screen. Touch sensor 512 may allow one or more gestures, including tap and swipe gestures, to be detected. Touch sensor 512 may be a capacitive sensor that includes multiple electrodes. In some embodiments, touch sensor 512 is a touch strip that includes five or more electrodes.

Radar sensor 513 may be configured to output radio waves into the ambient environment in front of electronic display 511 of thermostat 510. Radar sensor 513 may be an integrated circuit that includes one or more antennas, one or more RF emitters, and one or more RF receivers. Radar sensor 513 may be able to detect the presence of a user and the distance at which the user is located. Radar sensor 513 may use frequency-modulated continuous wave (FMCW) radar. Radar sensor 513 may emit radio waves and receive reflected radio waves through cover 522. Radar sensor 513 may emit chirps of radar that sweep from a first frequency to a second frequency. Therefore, the waveform output by radar sensor 513 may be a saw tooth waveform. Using receive-side beam steering on the reflected radio waves received using multiple antennas, certain regions may be targeted for sensing the presence of users. For instance, beam steering away from the ground may be performed to avoid pets being potentially incorrectly detected as a user.

Network interface 514 may be used to communicate with one or more wired or wireless networks. Network interface 514 may communicate with a wireless local area network, such as a WiFi network. Additional or alternative network interfaces may also be present. For example, thermostat 510 may be able to communicate with a user device directly, such as using Bluetooth. Thermostat 510 may be able to communicate via a mesh network with various other home automation devices. Mesh networks may use relatively less power compared to wireless local area network-based communication, such as WiFi. In some embodiments, thermostat 510 can serve as an edge router that translates communications between a mesh network and a wireless network, such as a WiFi network. In some embodiments, a wired network interface may be present, such as to allow communication with a local area network (LAN). One or more direct wireless communication interfaces may also be present, such as to enable direct communication with a remote temperature sensor installed in a different housing external and distinct from housing 521. The evolution of wireless communication to fifth generation (5G) and sixth generation (6G) standards and technologies provides greater throughput with lower latency which enhances mobile broadband services. 5G and 6G technologies also provide new classes of services, over control and data channels, for vehicular networking (V2X), fixed wireless broadband, and the Internet of Things (IoT). Thermostat 510 may include one or more wireless interfaces that can communicate using 5G and/or 6G networks.

Speaker 515 can be used to output audio. Speaker 515 may be used to output beeps, clicks, or other audible sounds, such as in response to the detection of user input via touch sensor 512.

Ambient light sensor 516 may sense the amount of light present in the environment of thermostat 510. Measurements made by ambient light sensor 516 may be used to adjust the brightness of electronic display 511. In some embodiments, ambient light sensor 516 senses an amount of ambient light through cover 522. Therefore, compensation for the reflectivity of cover 522 may be made such that the ambient light levels are correctly determined via ambient light sensor 516. A light pipe may be present between ambient light sensor 516 and cover 522 such that in a particular region of cover 522, light that is transmitted through cover 522, is directed to ambient light sensor 516, which may be mounted to a printed circuit board (PCB), such as a PCB to which processing system 519 is attached.

One or more temperature sensors, such as temperature sensor 517, may be present within thermostat 510. Temperature sensor 517 may be used to measure the ambient temperature in the environment of thermostat 510. One or more additional temperature sensors that are remote from thermostat 510 may additionally or alternatively be used to measure the temperature of the ambient environment.

Cover 522 may have a transmissivity sufficient to allow illuminated portions of electronic display 511 to be viewed through cover 522 from an exterior of thermostat 510 by a user. Cover 522 may have a reflectivity sufficient such that portions of cover 522 that are not illuminated from behind appear to have a mirrored effect to a user viewing a front of thermostat 510.

HVAC interface 518 can include one or more interfaces that control whether a circuit involving various HVAC control wires that are connected either directly with thermostat 510 or with backplate 520 is completed. A heating system (e.g., furnace, heat pump), cooling system (e.g., air conditioner), and/or fan may be controlled via HVAC wires by opening and closing circuits that include the HVAC control wires.

Processing system 519 can include one or more processors. Processing system 519 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD) of thermostat 510.

Processing system 519 may output information for presentation to electronic display 511. Processing system 519 can receive information from touch sensor 512, radar sensor 513, and ambient light sensor 516. Processing system 519 can perform bidirectional communication with network interface 514. Processing system 519 can output information to be output as sound to speaker 515. Processing system 519 can control the HVAC system via HVAC interface 518.

Housing 521 may house all of the components of thermostat 510. Touch sensor 512 may be interacted with a user through housing 521. Housing 521 may define a sidewall and an aperture, such as a rounded aperture (e.g., a circular aperture) in which cover 522 is present.

Thermostat 510 may be attached (and removed) from backplate 520. HVAC control wires may be attached with terminals or receptacles of backplate 520. Alternatively, such control wires may be directly connected with thermostat 510. In some embodiments, trim plate 530 may additionally be installed between backplate 520 and a surface, such as a wall, such as for aesthetic reasons (e.g., cover an unsightly hole through which HVAC wires protrude from the wall.

Network 540 can include one or more wireless networks, wired networks, public networks, private networks, and/or mesh networks. A home wireless local area network (e.g., a Wi-Fi network) may be part of network 540. Network 540 can include the Internet. Network 540 can include a mesh network, which may include one or more other smart home devices, may be used to enable thermostat 510 to communicate with another network, such as a Wi-Fi network. Thermostat 510 may function as an edge router that translates communications from a relatively low power mesh network received from other devices to another form of network, such as a relatively higher power network, such as a Wi-Fi network.

Cloud-based server system 550 can maintain an account mapped to smart thermostat 510. Thermostat 510 may periodically or intermittently communicate with cloud-based server system 550 to determine whether setpoint or schedule changes have been made. A user may interact with thermostat 510 via computerized device 560, which may be a mobile device, smartphone, tablet computer, laptop computer, desktop computer, or some other form of computerized device that can communicate with cloud-based server system 550 via network 540 or can communicate directly with thermostat 510 (e.g., via Bluetooth or some other device-to-device communication protocol). A user can interact with an application executed on computerized device 560 to control or interact with thermostat 510.

Power-Steering Wire Selection

Figure 6:
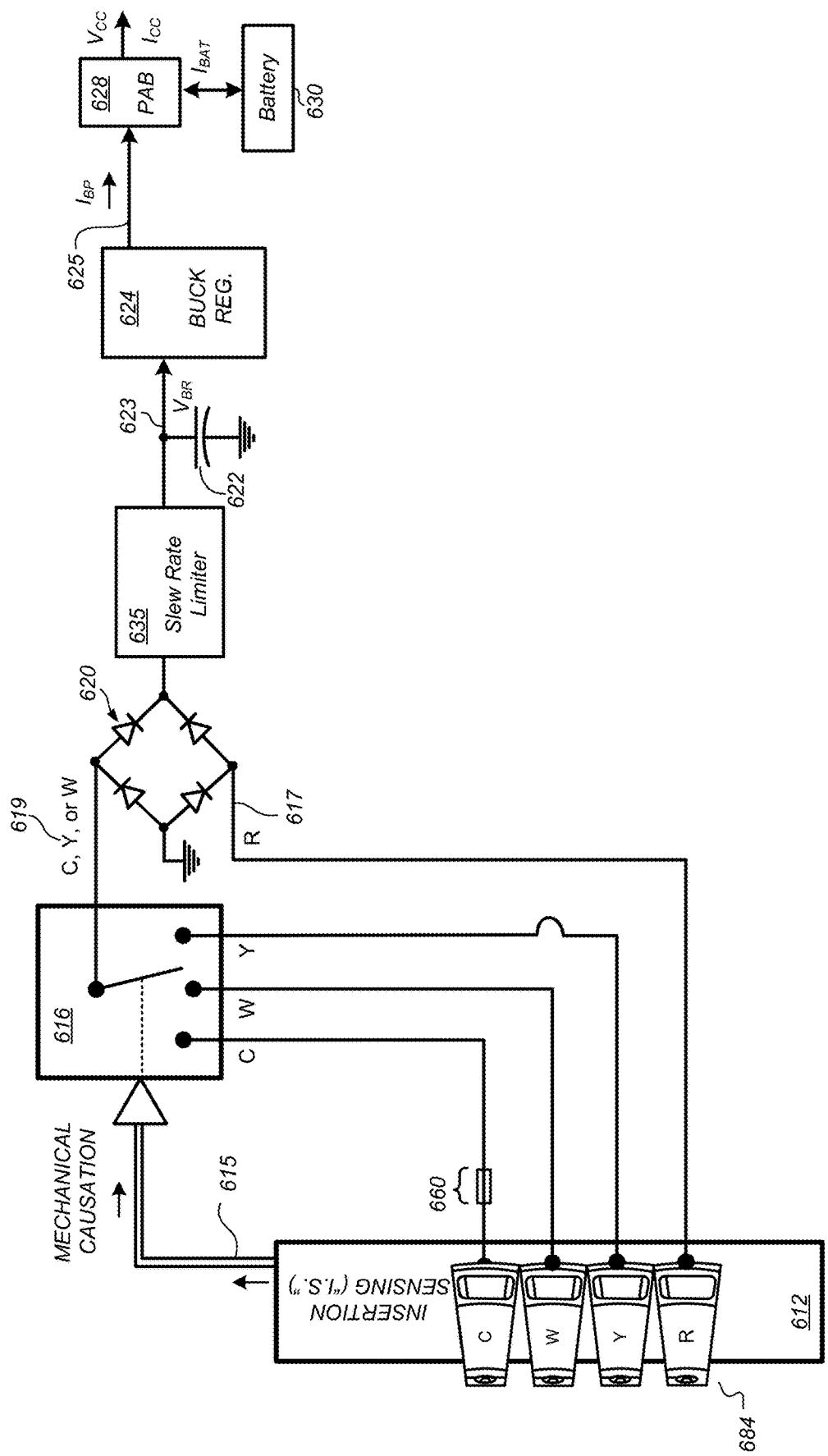
FIG. 6 illustrates a power management and power harvesting system for a smart thermostat, according to some embodiments.

FIG. 6 illustrates a power management and power harvesting system for a smart thermostat, according to some embodiments. FIG. 6 shows connections to common HVAC wiring, such as a W (heat call relay wire); Y (cooling call relay wire); R (heat/cooling call relay power); and C (common wire). The thermostat 100 comprises a plurality of FET switches used for carrying out the essential thermostat operations of connecting or "shorting" one or more selected pairs of HVAC wires together according to the desired HVAC operation. The operation of each of the FET switches is controlled by a secondary processor which can comprise, for example, an STM32L 32-bit ultra-low power ARM-based microprocessor available from ST Microelectronics, or the MIMXRT1061VDL6B MCU from NXP Semiconductor. The thermostat 100 may also include powering circuitry illustrated in FIG. 6. Generally speaking, the purpose of the powering circuitry is to extract electrical operating power from the HVAC wires and convert that power into a usable form for the many electrically-driven components of the thermostat 100.

In some previous solution, the thermostat 100 may have further included insertion sensing components 612 configured to provide automated mechanical and electrical sensing regarding the HVAC wires that are inserted into the thermostat 100. The insertion sensing components 612 include a plurality of HVAC wiring connectors 684, each containing an internal springable mechanical assembly that, responsive to the mechanical insertion of a physical wire thereinto, will mechanically cause an opening or closing of one or more dedicated electrical switches associated therewith. Note that the wiring connectors 684 may include other wire connectors that are not shown explicitly in FIG. 6, such as an AUX connector, an O/B connector, a G connector, an HUM connector, a Y2 connector, and so forth. These additional inputs may be used to control secondary air conditioners, auxiliary heating elements, humidifiers, heat pumps, and other environmental systems. However, these additional wiring connectors have been omitted from FIG. 6 for clarity and in order to focus on the power-stealing inputs used by the power stealing circuitry. Additionally, the Rc and Rh terminals are represented as the R terminal, since some embodiments may automatically jumper these two wire connectors together unless separate wires are inserted in each of the Rc and Rh terminals. Therefore, this disclosure may refer to the R terminal to include either or both of the Rc and Rh terminals. With respect to the HVAC wiring connectors 684 that are dedicated to the C, W, Y, and R terminals, those dedicated electrical switches are, in turn, networked together in a manner that yields the results that are illustrated in FIG. 6 by blocks 616. The output of block 616, which is provided at a node 619, may dictated solely by virtue of the particular combination of C, W, and Y connectors into which wires have been mechanically inserted in accordance with rules that preferentially select the C wire, then the Y wire, then the W wire. Selecting a power-stealing wire by virtue of mechanical causation may be replaced by the diode-selection circuit/method described below in some embodiments.

The configuration of FIG. 6 may automatically adapt to the powering situation presented to the thermostat 100 at the time of installation and thereafter. The powering circuitry comprises a full-wave bridge rectifier 620, a storage and waveform-smoothing bridge output capacitor 622 (which can be, for example, on the order of 30-35 microfarads) and a buck regulator 624. Note that the powering circuitry may include other elements, such as a power-and-battery (PAB) regulation circuit 628, and a battery 630. Power stolen from the wires selected by block 616 may pass through a slew rate limiter 635 and charge the output capacitor 622. Charge from the output capacitor 622 may be provided to the buck regulator 624, which may in turn provide a rectified voltage output at node 625 to operate the thermostat and/or to charge a battery. The powering circuitry generally serves to provide a main voltage Vcc that is used by the various electrical components of the thermostat 100, and that in one embodiment may be about 3.7V~3.95V. The general purpose of powering circuitry is to convert the 24 VAC presented between the input nodes 619 and 617 to a steady DC voltage output at the Vcc MAIN node to supply the thermostat electrical power load.

Operation of the powering circuitry for the case in which the "C" wire is present is now described. When the 24 VAC input voltage between nodes 619 and 617 is rectified by the full-wave bridge rectifier 620, a DC voltage at node 623 is present across the bridge output capacitor 622, and this DC voltage is converted by the buck regulator 624 to a relatively steady voltage, such as 4.4 volts, at node 625, which provides an input current $I_{BP}$ to the PAB regulation circuit 628.

A processor may control the operation of the powering circuitry at least by virtue of control leads leading between the processor and the PAB regulation circuit 628, which for one embodiment can include an STM32L chip. The PAB regulation circuit 628 may provide the ability for the processor to specify a maximum value $I_{BP}$(max) for the input current $I_{BP}$. The PAB regulation circuit 628 may be configured to keep the input current at or below $I_{BP}$(max), while also providing a steady output voltage $V_{cc}$, such as 4.0 volts, while also providing an output current $I_{cc}$ that is sufficient to satisfy the thermostat electrical power load, while also tending to the charging of the battery 630 as needed when excess power is available, and while also tending to the proper discharging of the battery 630 as needed when additional power (beyond what can be provided at the maximum input current $I_{BP}$(max)) is needed to satisfy the thermostat electrical power load.

Operation of the powering circuitry for the case in which the "C" wire is not present is now described. As used herein, "inactive power stealing" refers to the power stealing that is performed during periods in which there is no active call in place based on the lead from which power is being stolen. As used herein, "active power stealing" refers to the power stealing that is performed during periods in which there is an active call in place based on the lead from which power is being stolen.

During inactive power stealing, power is stolen from between, for example, the "Y" wire that appears at node 619 and the R lead that appears at node 617. There may be a 24 VAC HVAC transformer voltage present across nodes 619/617 when no cooling call is in place (i.e., when a corresponding Y-R FET switch is open). For one embodiment, the maximum current $I_{BP}$(max) is set to a relatively modest value, such as 20 mA, for the case of inactive power stealing. Assuming a voltage of about 4.4 volts at node 625, this corresponds to a maximum output power from the buck regulator 624 of about 88 mW. This power level of 88 mW has been found to not accidentally trip the HVAC system into an "on" state due to the current following through the call relay coil. During this time period, the PAB regulation circuit 628 operates to discharge the battery 630 during any periods of operation in which the instantaneous thermostat electrical power load rises above 88 mW, and to recharge the battery (if needed) when the instantaneous thermostat electrical power load drops below 88 mW. The thermostat 100 is configured such that the average power consumption is well below 88 mW, and indeed for some embodiments is even below 10 mW on a long-term time average.

Operation of the powering circuitry for "active power stealing" is now described. During an active heating/cooling call, it may be necessary for current to be flowing through the HVAC call relay coil sufficient to maintain the HVAC call relay in a "tripped" or ON state at all times during the active heating/cooling call. The processor may be configured to turn, for example, a Y-R FET switch (not shown) OFF for small periods of time during the active cooling call, wherein the periods of time are small enough such that the cooling call relay does not "un-trip" into an OFF state, but wherein the periods of time are long enough to allow inrush of current into the bridge rectifier 620 to keep the bridge output capacitor 622 to a reasonably acceptable operating level. For one embodiment, this is achieved in a closed-loop fashion in which the processor monitors the voltage VBR at node 623 and actuates a Y-R FET switch as necessary to keep the bridge output capacitor 622 charged. According to one embodiment, it has been found advantageous to introduce a delay period, such as 60-90 seconds, following the instantiation of an active heating/cooling cycle before instantiating the active power stealing process. This delay period has been found useful in allowing many real-world HVAC systems to reach a kind of "quiescent" operating state in which they will be much less likely to accidentally un-trip away from the active cooling cycle due to active power stealing operation of the thermostat 100. According to another embodiment, it has been found further advantageous to introduce another delay period, such as 60-90 seconds, following the termination of an active cooling cycle before instantiating the inactive power stealing process. This delay period has likewise been found useful in allowing the various HVAC systems to reach a quiescent state in which accidental tripping back into an active cooling cycle is avoided.

The embodiment described above uses mechanical causation and mechanical sensing and insertion sensing components 612 to determine whether a C wire, a W wire, a Y wire, and/or an R wire has been inserted into the wire connectors 684. This mechanical causation physically connects one of the C, W, or Y wires to node 619 using the rules described above. No electronic sensing, switching, and/or actuation is necessary for this automatic selection of a power-stealing wire to occur. This provides a simple, low-power solution for wire selection.

However, relying on the mechanical sensing and insertion sensing components 612 and the mechanical causation elements to make this automatic connection leaves room for improvement. For example, the mechanical sensing and insertion sensing components 612 only detect whether a physical wire has been mechanically inserted into the wiring connectors 684. The mechanical sensing and insertion sensing components 612 need not perform any electrical testing on a signal provided by the wire. For example, although a wire may be physically inserted into the wiring connectors 684, it may be a "dead" wire that does not provide any electrical power and/or return. In some environmental systems, the input may be electrically active but relatively high-impedance such that it cannot provide enough current for the power-stealing operation described above. Additionally, some situations may arise where it may be more efficient or necessary to switch power stealing wires during operation. Using mechanical causation, the system would default to using the C wire if provided, then move to the Y wire, and then move to the W wire. Using a purely mechanical solution, there was no way to switch between the Y wire and the W wire during operation and after installation. For example, if the input to the Y wire began to "trip" the air conditioner relay during power stealing, it may be beneficial to switch to the W wire instead.

Figure 7:
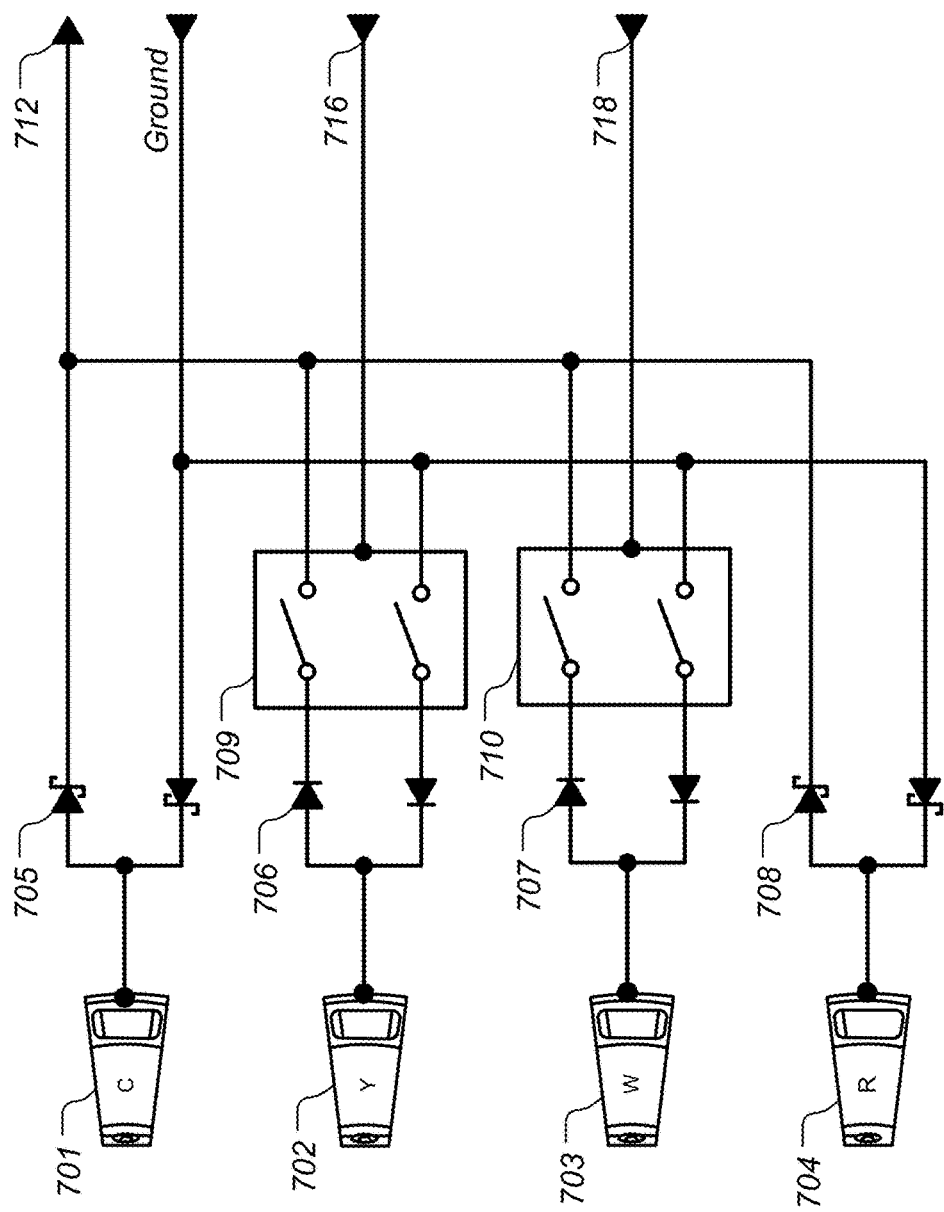
FIG. 7 illustrates an electrical solution for selecting a power stealing wire, according to some embodiments.

FIG. 7 illustrates an electrical solution for selecting a power stealing wire, according to some embodiments. Note that FIG. 7 does not explicitly show the mechanical sensing and insertion sensing components 612 and the mechanical causation that were present in FIG. 6. However, while these mechanical elements may still be present in the embodiment of FIG. 7, they have been removed from this illustration simply to emphasize the electrical circuit elements that are now introduced to perform a similar function of selecting a power-stealing wire.

This embodiment uses three example power wire connectors: the C wire connector 701, the Y wire connector 702, and/or the W wire connector 703. These wire connectors share the same return through the R wire connector 704. As described above, the R wire connector may represent the $R_h$ and/or $R_c$ wire connector separately or individually, and these two wire connectors may be jumpered together automatically or manually. Each of these three power wire connectors may be received in parallel and coupled to individual diode rectification circuits 705, 706, 707. The outputs of these diode rectification circuits 705, 706, 707 may be coupled to node 712. Node 712 may be coupled to the slew rate limiter 635 in FIG. 6. For example, the diode rectification circuits 705, 706, 707 in FIG. 7 may replace the bridge rectifier 620 in FIG. 6.

In order to select one of the power wire connectors 701, 702, 703 for power stealing, the voltage drops associated with the diode rectification circuits 705, 706, 707 may be selected accordingly. Specifically, the forward voltage of each of the diodes in the diode rectification circuits 705, 706, 707 may be selected to set the order of preference for the power wire connectors 701, 702, 703. For example, the forward voltage drop (e.g., 0.3 V-0.4 V) for the diode rectification circuit 705 for the C wire connector 701 may be lower than the forward voltage drop (e.g., 0.5 V-0.6V) for the diode rectification circuit 706 for the Y wire connector 702. This will cause the diodes in the diode rectification circuit 705 to connect to the C wire connector 701 to node 712, and also cause the diodes in the diode rectification circuits 706, 707 not to conduct, thereby disconnecting the Y wire connector 702 and/or the W wire connector 703 from node 712.

By selecting the diode properties, a preference between the power wire connectors 701, 702, 703 may be established. Although the C wire connector 701 has been given preference in the example above, this is provided only by way of example and is not meant to be limiting. Depending on the external environmental system that is coupled to the power wire connectors 701, 702, 703, any order of preference may be established by selecting the diode properties such that preferred power wire connectors have a lower voltage drop when compared to the diode rectification circuits of other power wire connectors. For example, some embodiments may use diodes in the diode rectification circuit 707 with a lower forward voltage drop than the diodes in the diode rectification circuit 706, thereby preferring the W wire connector over the Y wire connector for power stealing. Additionally, the circuit illustrated in FIG. 7 may be expanded to include any number of power wire connectors and corresponding diode rectification circuits depending on the needs of the particular embodiment. For example, non-thermostat embodiments may use more than three power wire connectors.

In some embodiments, Schottky diodes may be used for the diode rectification circuits 705, 708 for the C wire connector 701 and/or the R wire connector 704. These wire connectors are typically direct-wire connections in an HVAC system, and diodes, such as Schottky diodes, with relatively low forward voltage drops may be used. In contrast, the Y wire connector 702 and/or the W wire connector 703 may use silicon diodes (e.g., P-N junction diodes) in their diode rectification circuits 706, 707, as these wire connectors are often coupled to a load such as a call relay or other inductive load. This ensures that the system preferentially powers through the C wire connector 701, even if the Y wire connector 702 and the W wire connector 703 are coupled to node 712 without interruption (e.g., using switches 709, 710 described below).

Other embodiments may implement the any of the diode rectification circuits 705, 706, 707, 708 using an active circuit that operates as an ideal diode instead of using actual diodes. These active circuit may implement diode drops that are lower than those used in traditional diodes to further prioritize the different inputs. For example, active circuits may be used on the C and R wires as an active diode bridge IC (or a controller with external FETs), while the other wires may use discrete components. These may be implemented as an op amp with a reference and a pass FET, along with other circuit components. Some embodiments may use Ideal Diode controllers available from Texas Instruments®.

In addition to the automatic selection of a power-stealing wire that may be performed by the diode rectification circuits 705, 706, 707, some embodiments may also include electronic switches 709, 710 that can programmatically be operated to dynamically switch between different power wire connectors at any time. The electronic switches 709, 710 may be controlled by command signals 716, 718 from the processor to control the operation of the electronic switches 709, 710.

Typically, these electronic switches 709, 710 may be used to force an isolation of one or more of the power wire connectors from node 712. For example, the Y wire connector 702 may be selected as the default power wire connector in absence of an operable C wire being inserted in the C wire connector 701 by virtue of the relative forward diode drops between the Y wire connector 702 and the W wire connector 703. However, during operation, power stealing through the Y wire connector 702 may cause the air-conditioning function of the HVAC system to "trip", and it may become necessary to switch to the W wire connector 703. Because the values of the diode rectification circuits 706, 707 typically cannot be changed after the thermostat 100 is manufactured, the switches 709, 710 may be used to force a change between these power wire connectors for power stealing during operation. Specifically, the command signals 716 may cause the electronic switches 709 to open, thereby disconnecting the Y wire connector 702 from node 712. The command signals 718 may also cause the electronic switches 710 to close, thereby connecting the W wire connector 703 to node 712. Combinations of forward voltage drops on the diodes in the diode rectification circuits 705, 706, 707 may be used in conjunction with commands through the command signals 716, 718 to select and/or override a preferred order in which the power command wire connectors 701, 702, 703 may be used for power stealing.

This combination of diode rectification circuits and electronic switches may be advantageous in particularly sensitive systems. For example, some zone control boards may trigger with approximate 10 μA of current, an amount which may occur as leakage through the diodes. Note that the diodes in FIG. 7 are not ideal diodes, and thus some leakage current may occur even when they are not fully forward conducting, although ICs that approximate ideal diode behavior may be used instead as described above. Additionally, methods are described below for testing and/or characterizing the electrical characteristics of signals received through the Y wire connector 702 and/or the W wire connector 703. The electronic switches 709, 710 may be used to isolate these two wire connectors 702, 703 so they can be tested and/or characterized individually.

Figure 8:
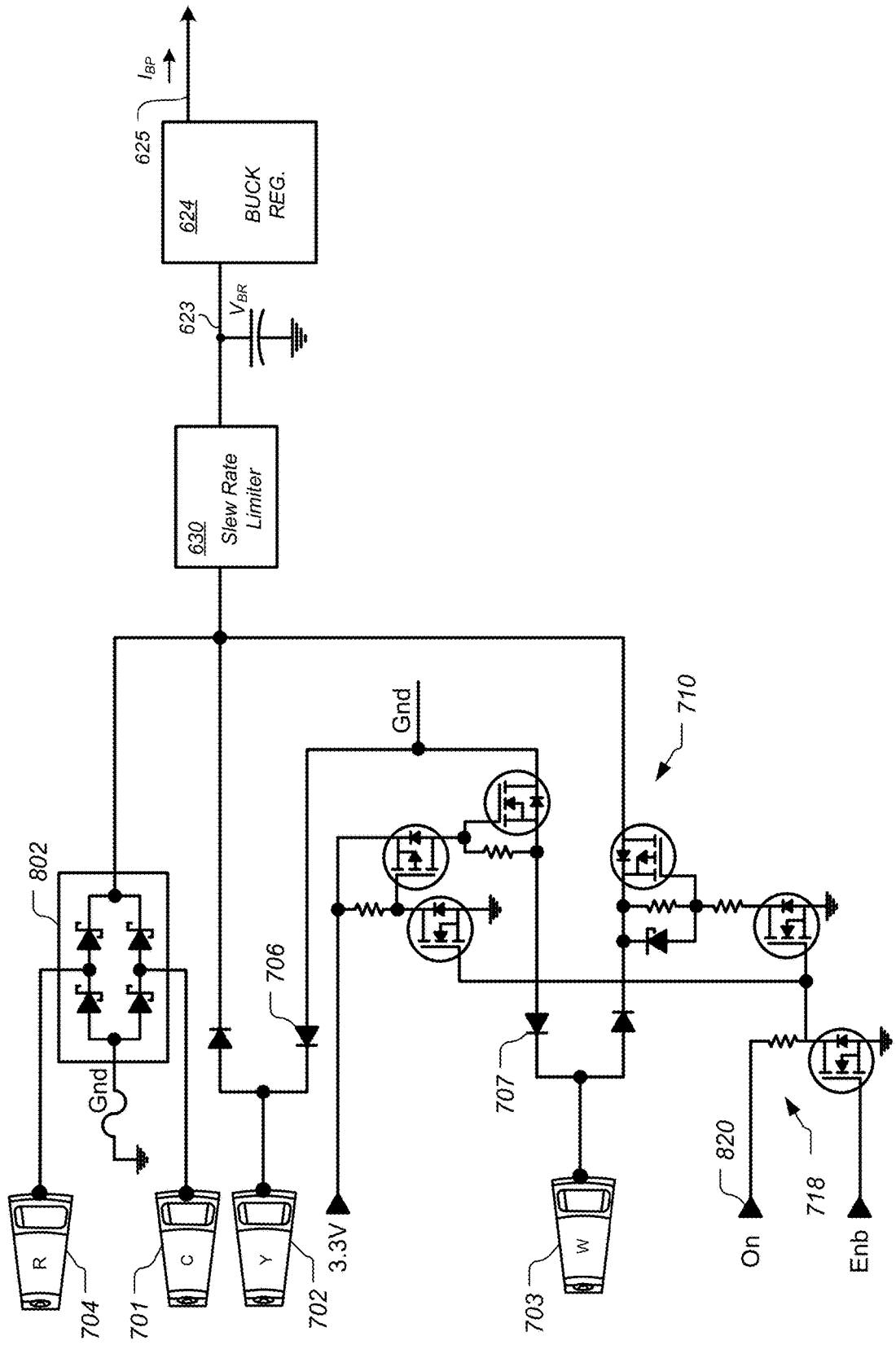
FIG. 8 illustrates a circuit diagram for implementing the diode rectifier circuits and electronic switches for selecting a power-stealing circuit, according to some embodiments.

FIG. 8 illustrates a circuit diagram for implementing the diode rectifier circuits and electronic switches for selecting a power-stealing circuit, according to some embodiments. The R wire connector 704 and the C wire connector 701 use a packaged bridge rectifier 802 in this implementation. However the diode rectification circuits 706, 707 for the Y wire connector 702 and the W wire connector 703 may use discrete diodes. The forward voltage drop of the packaged bridge rectifier 802 may be approximately 0.35 V at 10 mA, and the forward voltage drop of the diodes in the diode rectification circuits 706, 707 may be approximately 0.60 V. These numbers are provided only by way of example. Note that the fused ground ("Gnd") may be shared with other ground signals in FIG. 8 that are similarly labeled.

In this implementation, the electronic switches 709 have been omitted from the Y wire connector 702 circuit. Instead, only the electronic switches 710 for the W wire connector 703 have been included. This is done only by way of example and is not meant to be limiting. The values for the diodes in the diode rectification circuits 706, 707 may be selected such that the W wire connector 703 is the default wire selected at startup. Afterwards, the Y wire connector 702 can be selected instead by opening the electronic switches 710 for the W wire connector 703. At any point, the power stealing system can switch back to the W wire connector 703 by closing the switches 710.

The electronic switches 710 may be implemented using discrete FET switches and resistors in the arrangement shown in FIG. 8. A command signal 718 can be used to enable the FET switches and turn them on. Some embodiments may ensure that the command signal 718 is powered at startup, thereby selecting the W wire connector 703 by default when the smart-home device is turned on (e.g., using a main power rail signal 820). As described above, this can be overridden by opening the electronic switches 710 to switch to the Y wire connector 702.

Figure 9:
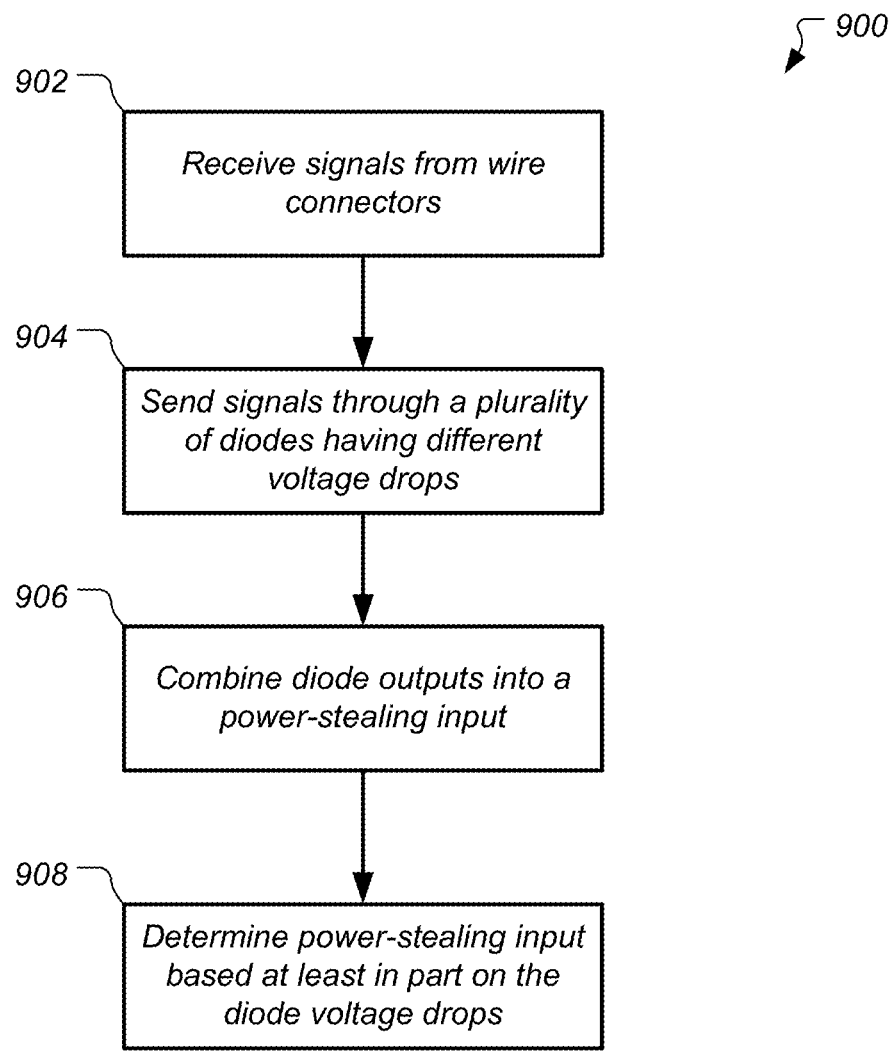
FIG. 9 illustrates a method for selecting between a plurality of wire connectors for a power-stealing operation, according to some embodiments.

FIG. 9 illustrates a method for selecting between a plurality of wire connectors for a power-stealing operation, according to some embodiments. The method may include receiving a plurality of signals from a plurality of wire connectors (902). The wire connectors may include power wire connectors, such as a Y wire, C wire, a W wire, and so forth. The wire connectors may also include one or more return wires such as an R wire, or combinations of an Rc wire and/or an Rh wire. The wire connectors may also include mechanical sensing and insertion elements that determine when a wire is physically inserted into the wiring connectors. Note that the signals received through the wiring connectors may include electrical signals. These electrical signals may be, for example 24 VAC provided from an HVAC system. These electrical signals may also include a 0 V or floating voltage if the wire connector is not connected properly or at all to the HVAC system. Therefore, this step does not require that a wire be inserted into the wire connectors, or that a wire inserted into the wire connectors be electrically active. Instead, this step simply connects any signal that may be received to subsequent circuit elements as described above.

The method may also include sending the plurality of signals through a plurality of diodes (904). The plurality of diodes may be arranged as diode rectifier bridges or diode pairs. Silicon diodes, Schottky diodes, and other diode types may be used without limitation. Additionally, this recitation of diodes or diode rectification circuits may include active circuits or ICs that approximate ideal diode behavior, such as an ideal diode controller with external pass device FETs. In some embodiments, some diodes may have different forward voltage drops than other diodes. These forward voltage drops may be configured to preferentially select from among the power wire connectors a wire connector to be used in power stealing according to a predefined order.

The method may additionally include combining the diode outputs into a power-stealing input (906). The outputs of each of the diodes may be combined into an input to a power-stealing circuit. The power-stealing circuit may include a slew rate limiter, a buck converter, a battery charging circuit, other power regulation circuits, and/or signals provided by a microprocessor to control the timing and activation of the various power-stealing circuit elements.

The method may further include determining a power stealing input based at least in part on the diode voltage drops (908). As described above, the forward voltage drops for each of the diodes may be different and configured to select between the various power wire connectors. For example, a power wire connector coupled to diodes having the smallest forward voltage drop may be selected with preference over a power wire connector coupled to diodes having a larger forward voltage drop. Some embodiments may also include electronic switches coupled to the diode rectifier circuits. These electronic switches may be used to override a selection that was made based on the forward voltage drops of the diodes. As described below, the switches may be used to isolate a single power wire connector to test and/or characterize an electrical signal provided through the power wire connector.

Figure 10:
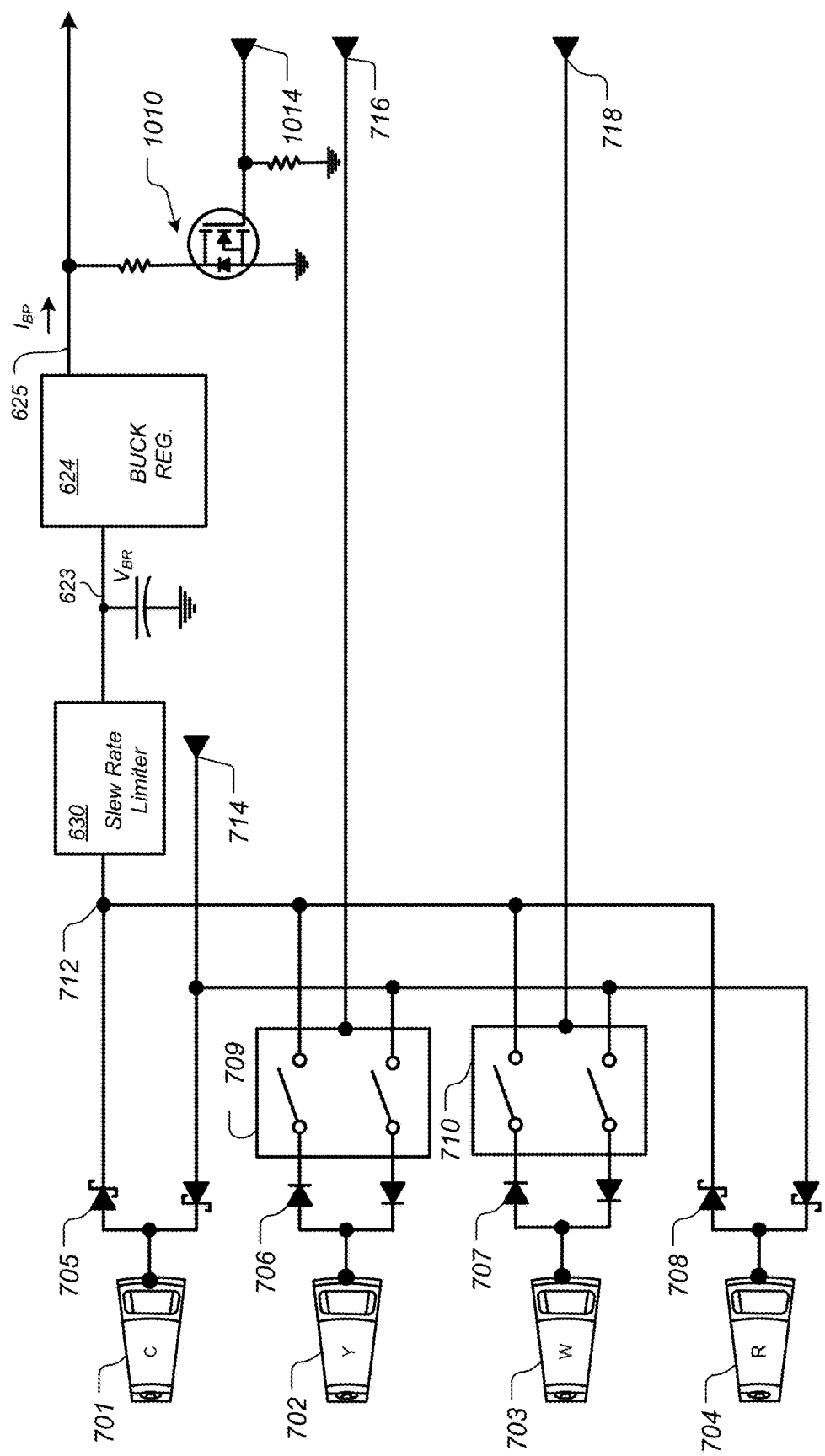
FIG. 10 illustrates a circuit for testing and/or characterizing signals provided by the power wire connectors, according to some embodiments.

FIG. 10 illustrates a circuit for testing and/or characterizing signals provided by the power wire connectors, according to some embodiments. As described above, the electronic switches 709, 710 may be used in conjunction with the diode rectification circuits 705, 706, 707 to isolate and select a single one of the power wire connectors 701, 702, 703. One of the advantages provided by these embodiments is the ability to test and monitor the effect of a power stealing operation on the load in real time as the system operates for any of the selected inputs.

Some embodiments may provide a programmable resistive load 1010 that can be set by a signal 1014 from a microprocessor. The resistive load 1010 may be used to vary how much of a load the system provides for the external environmental system under control, such as an HVAC system. The resistive load 1010 may be placed between the system power and the system ground at the output of the buck converter. The resistive load 1010 may be varied by a PWM signal provided through signal 1014 from the microprocessor. Varying signal 1014 may change the conductance of the transistor in the resistive load 1010 and thereby change the impedance of the internal load 1010 seen by the HVAC system. In some embodiments, the signal 1014 may be generated by a controlled stable current with an op amp feedback circuit instead of a pulsed current with a PWM circuit. The resistive load may also be implemented by one or more resistors in parallel, series, and/or combination. For example, a plurality of parallel resistors may be used to spread the heat generated out over a number of different discrete parts.

Some embodiments may gradually increase the impedance provided by the internal load 1010 and measure the voltage drop across the internal load 1010 to estimate the impedance of the external load coupled to the corresponding power wire connector. Alternatively, some embodiments may measure the voltage drop caused by the load at the input to the buck regulator 624. The system knows how much extra current the load is pulling (since the system sets this value), and a current measurement circuit may measure the total current out of the buck regulator 624. The change in the input voltage caused by the change in current may be used to calculate the impedance of the HVAC system beyond the connector. For example, the Y wire connector 702 may be isolated by opening the switches 710 for the W wire connector 703. The internal load 1010 may be adjusted, and the impedance of the connection through the Y wire connector 702 may be measured. A similar process may be used to test and characterize the signal through the W wire connector 703 by opening the switches 709 and closing the switches 710.

After characterizing the impedance of each of the external loads connected through the power wire connectors, the best power wire connector may be selected for power stealing. For example, if the impedance seen through the Y wire connector 702 exceeds a threshold, power stealing through the Y wire connector 702 may be more likely to inadvertently trigger the call relay of the air conditioning system. Generally, higher impedance loads through the power wire connectors are less ideal for power stealing compared to lower impedance loads. The system may constantly monitor the impedance of a load through the selected power wire connector during operation. If the value changes, becomes unstable, or exceeds a threshold, the system may switch between power wire connectors used for power stealing using the switches 709, 710.

Figure 11:
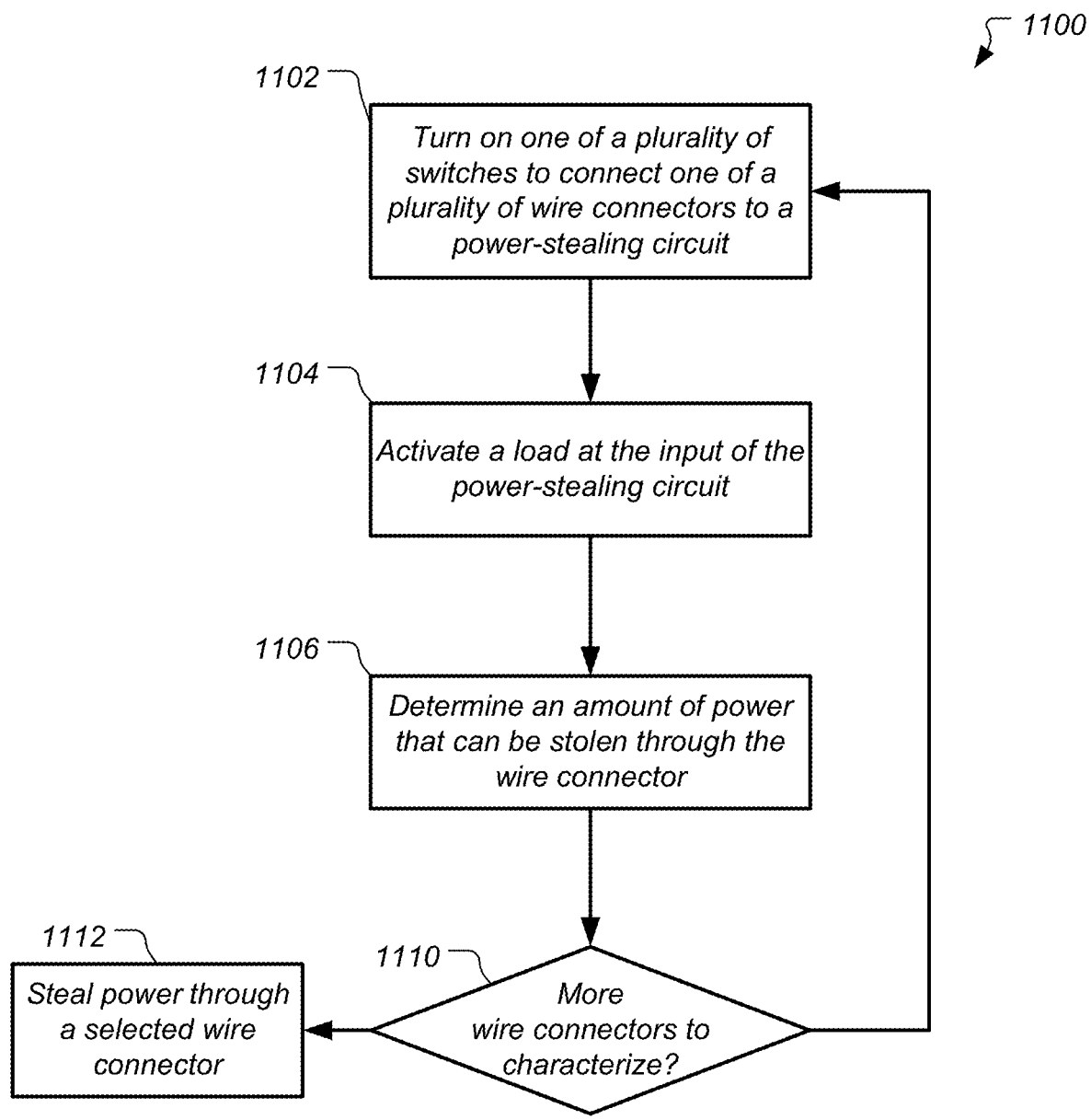
FIG. 11 illustrates a flowchart of a method for characterizing signals received through power wire connectors, according to some embodiments.

FIG. 11 illustrates a flowchart 1100 of a method for characterizing signals received through power wire connectors, according to some embodiments. The method may include turning on one of the plurality of switches connected to one of a plurality of wire connectors (1102). Turning on the switches may connect the selected power wire connector to an input of a power-stealing circuit. As described above, the power-stealing circuit may include a slew rate limiter, a power converter, a battery charger, a battery, and/or other elements of a power management system, including a microcontroller and signals from the microcontroller that control the timing and operation of the power-stealing circuitry. This step may include opening switches for other power wire connectors to isolate the selected power wire connector for testing and characterization.

The method may also include activating or setting a load at the input of the power-stealing circuit (1104). The load may be an adjustable internal resistive load as described above comprising one or more resistors and a transistor controlled by a signal from a processor. The load may be set using a signal from a processor that changes the conductance of a FET transistor and thereby changes the impedance of the internal resistive load. The value of this impedance may be adjusted up or down, and may be set at one or more threshold levels to observe the response (i.e., voltage change) at the input of a buck converter.

The method may additionally include determining an amount of power that can be stolen through the wire connector (1106). This step may include characterizing the external load attached to the wire connector by measuring the voltage change as described above. Power stealing thresholds (e.g., a voltage to which the capacitor 622 may be charged, a current that may be received by the regulator, etc.) may be tested to ensure that the selected wire connector can supply the appropriate amount of power. Some embodiments may also measure the stability of the voltage drop across the load to estimate the stability of the load connected to the wire connector. Unstable loads may not be ideal for power stealing.

The method may further include determining whether more power wire connectors remain to be characterized (1110). If more power wire connectors need to be characterized, these power wire connectors may be selected by using the electronic switches corresponding to those connectors as described above (1102). Once each of the power wire connectors has been tested and/or characterized, the smart-home device may continue by stealing power through the selected wire connector (1112). Note that the process illustrated in FIG. 11 may be carried out continuously throughout the operation of the smart-home device, and the device may switch between various wire connectors based on the results of this process.

Figure 12:
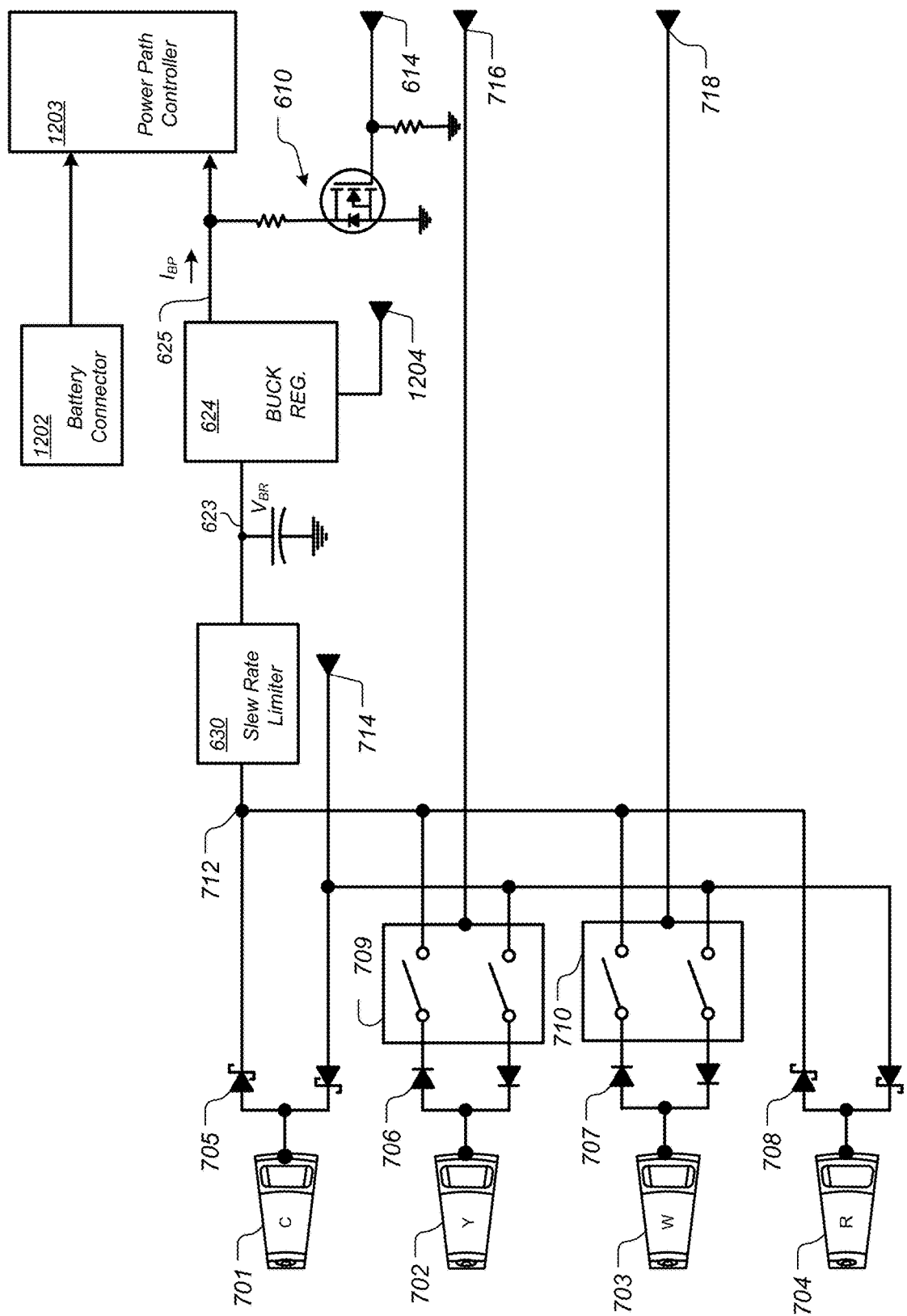
FIG. 12 illustrates how a battery may be integrated into the power-stealing circuitry, according to some embodiments.

FIG. 12 illustrates how a battery may be integrated into the power-stealing circuitry, according to some embodiments. A battery, battery charger, battery management system, etc., may be represented by the battery connector 1202 in FIG. 12. As described above, the output of the buck regulator 624 may be used to charge a battery and/or to power the smart-home device. During times when the power usage of the smart-home device is less than the amount of power being stolen from the external environmental system, the power stealing circuitry can provide power to charge the battery. In contrast, during times when the power usage of the smart-home device is more than the amount of power being stolen from the external environmental system, the power provided by the power-stealing circuitry may be augmented by power provided by the battery.

As described above, the internal load may be used to determine an amount of power that may be stolen from the external environmental system. This maximum amount may be used to set a threshold for the buck regulator 624. This threshold may be provided by a microprocessor through the input 1204 depicted in FIG. 12. This threshold may then limit the output current at node 625 provided by the buck regulator 624 to ensure that the power stealing circuitry does not cause the HVAC system to inadvertently trip by stealing too much power. When this threshold is reached, the battery connector 1202 may provide power from the battery to augment the power provided (and limited) by the buck regulator 624. Power may be provided from the battery connector 1202 to a power path controller 1203. The power path controller 1203 may be implemented using discrete components or as part of an integrated circuit, depending on the embodiment. The junction between the battery connector 1202 and the output of the buck regulator 624 may be made after the connection of the resistive load 1010 that is used as a test load resistor switch circuit, such that the system power may be isolated from the output of the buck regulator 624 during the load testing.

Power-Stealing Circuitry Timing

A typical modern HVAC system may have at least two functional components. First, the HVAC system may include a furnace or heater inside the house. When making a call to activate the furnace or heater, the thermostat provides a signal that may operate like a switch to turn on a heating element and an air handler inside the house. The air handler causes air to be circulated around the heating element and pushed to the rest of the home. When a thermostat calls for heat, it is not typically directly switching the heating system. Instead, it signals a call for heat to a digital control system which performs the sequence of steps required to safely activate the heating element and run a blower motor in the air handler to distribute heat throughout the rest of the house.

Figure 13:
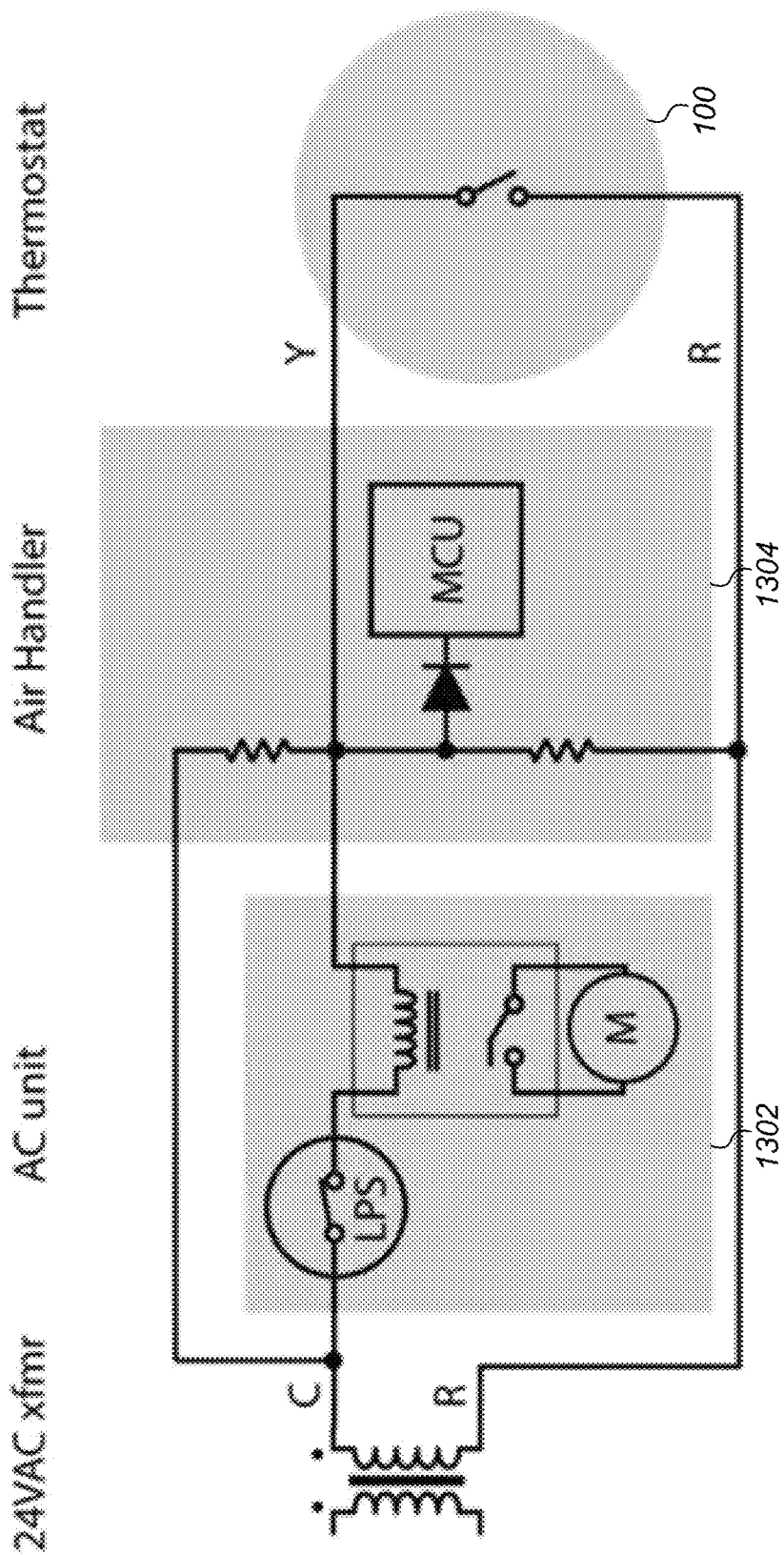
FIG. 13 illustrates a typical modern HVAC system, according to some embodiments.

Along with a heater or furnace, modern HVAC systems often also include an air-conditioning system. FIG. 13 illustrates a typical modern HVAC system, according to some embodiments. The air conditioning system may include an air handler 1304 inside the house, as well as an air-conditioning unit 1302 outside of the house. When a thermostat 100 calls for a cooling function, the process is slightly more complicated than the process for calling for a heating function. As with the heating function, the thermostat 100 signals the air handler 1304 to start the blower. Additionally, the thermostat switches a large motor inside the AC unit 1302 outside the home, which begins to pump coolant. This large compressor motor typically uses a very large switch known as a "contactor."

Figure 14:
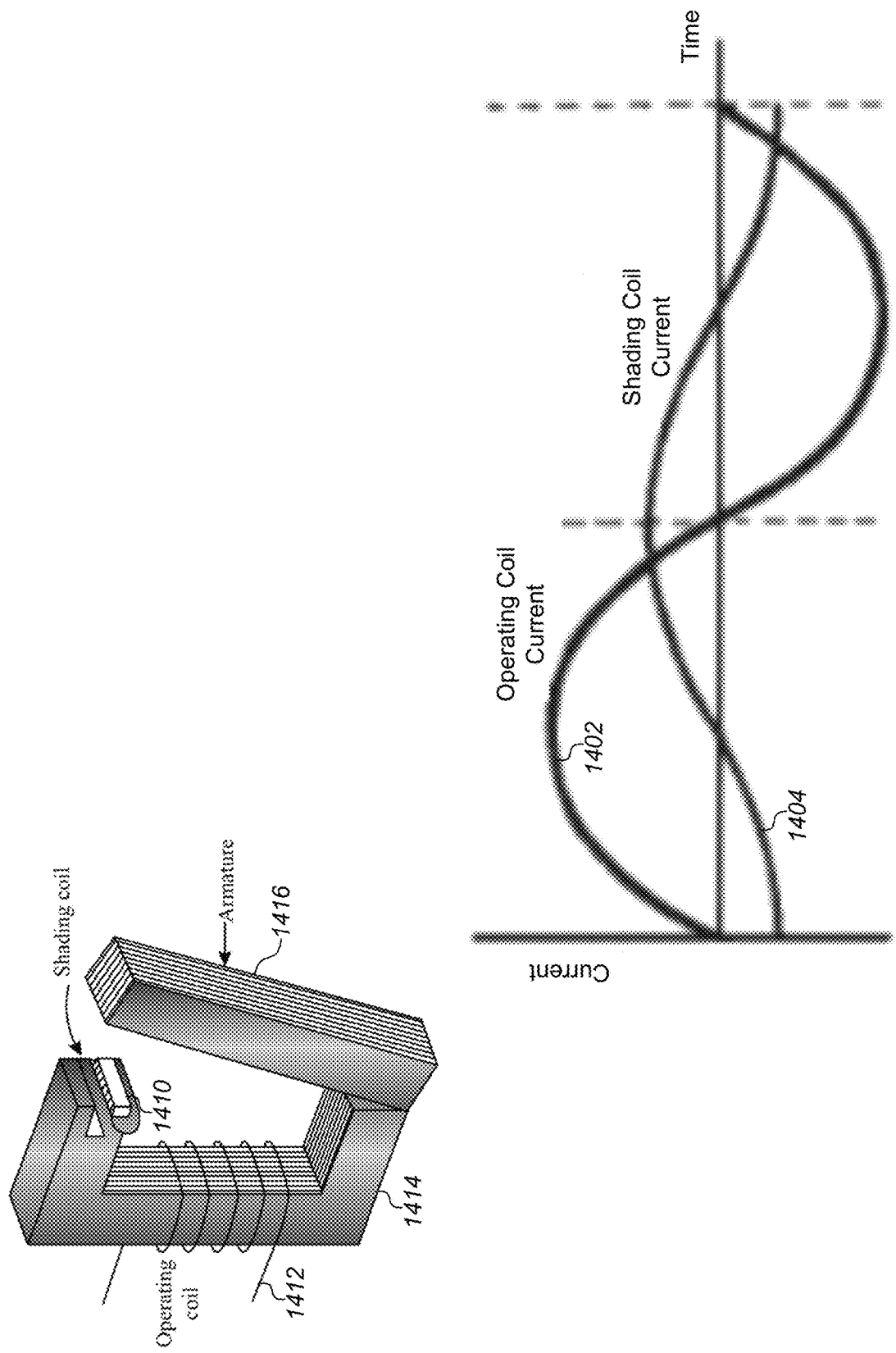
FIG. 14 illustrates a contactor and the associated current waveforms used to activate the contactor, according to some embodiments.

FIG. 14 illustrates a contactor 1414 and the associated current waveforms used to activate the contactor 1414, according to some embodiments. Unlike the heating system, which may be triggered by using tens of microamps of current, the contactor 1414 may take hundreds of milliamps of current to trigger. While this makes the contactor 1414 ideal for power stealing, it also presents unique difficulties when ensuring that the power stealing function does not interfere with the operation of the contactor 1414. Unlike general-purpose relays, contactors are designed to be directly connected to high-current load devices, such as the air conditioner motor outside the home.

The basic principle of operation for the contactor 1414 follows the general principles of an electromagnet. To close the contactor, a current is passed through the operating coil 1412. This causes a magnetic field to be generated in the contactor 1414 and close the armature 1416. When an alternating current is passed through the operating coil 1412, zero crossings of the AC current would normally result in a reduction of the magnetic field, which would cause the contactor 1414 to release the armature 1416 from its closed position. To prevent the armature 1416 from opening during zero crossings in the operating coil 1412, a contactor 1414 may include a shading coil 1410. The shading coil may include a small number of turns of an electrical conductor located in the face of the contactor 1414. A shading coil current 1404 that is passed through the shading coil 1410 may be out of phase from the operating coil current 1402 passing through the operating coil 1412. For example, some embodiments may use a 90° phase shift in the shading coil current 1404 in comparison to the operating coil current 1402. This phase shift allows the shading coil 1410 to hold the armature 1416 in place when the operating coil current 1402 allows the main flux in the contactor 1414 to fall to zero.

The primary purpose of the shading coil 1410 and the phase shift in the shading coil current 1404 is to prevent "chatter" in the contactor 1414. Chatter occurs when the armature 1416 rapidly opens and closes for brief instances causing interruptions in the contact between the body of the contactor 1414 and armature 1416. Chatter may cause interruptions in the motor of the air conditioner, which may adversely affect the operation and lifespan of the motor. Chatter may also induce large inductive currents that can cause serious damage to other connected systems.

Preventing chatter of the contactor 1414 in the air-conditioning system is a technical problem associated with power-stealing control systems. For example, a thermostat often preferentially steals power from the Y wire connected to an air conditioner. As described above, the high currents associated with the contactor 1414 provide an abundant current source for the power-stealing circuitry in the thermostat. However, it is important to ensure that stealing current from the current of the contactor 1414 does not itself cause the contactor 1414 to chatter. In order to prevent this type of interruption, the power-stealing system must ensure that it does not interrupt the average flow of current associated with the contactor 1414 while simultaneously stealing enough power to not interrupt the instantaneous power needs of the thermostat itself.

The embodiments described herein balance these two concerns by enabling a power-stealing window that is timed relative to a peak in the current for the contactor 1414. By limiting the power-stealing operation of the thermostat to a specific window when the current in the coil is at a maximum, the likelihood of chatter can be greatly reduced. During the current peak, there is more than enough current available to hold the armature 1416 in place, leaving extra current available for power stealing. Additionally, power stealing around the peak current of the operating coil provides a maximum amount of energy to the thermostat in a relatively short time interval. This allows the thermostat to charge an internal capacitor to much greater voltages, to reduce the number of power-stealing intervals during active power stealing, and to increase the efficiency of the power-stealing operation.

Referring back to FIG. 6, previous solutions have timed the active power stealing windows based on a measured voltage on the storage capacitor 622. For example, when the voltage on the storage capacitor 622 drops below a threshold, a processor would initiate a power stealing interval, which would open a switch between, for example, the Y wire connector and the corresponding return wire connector causing a voltage differential between these two wire connectors. The current that was previously passing through the switch would then be sent into the storage capacitor 622. The switch would remain open until the voltage on the storage capacitor 622 exceeded an upper threshold, or until a time limit for active power stealing was reached. For example, the storage capacitor 622 could be charged until the voltage exceeded 6 V or until a 100 μs timer expired. These methods of timing the active power stealing operation are described in detail in the commonly assigned U.S. patent application Ser. No. 15/680,632 filed Aug. 18, 2017, which is incorporated herein by reference.

Figure 15:
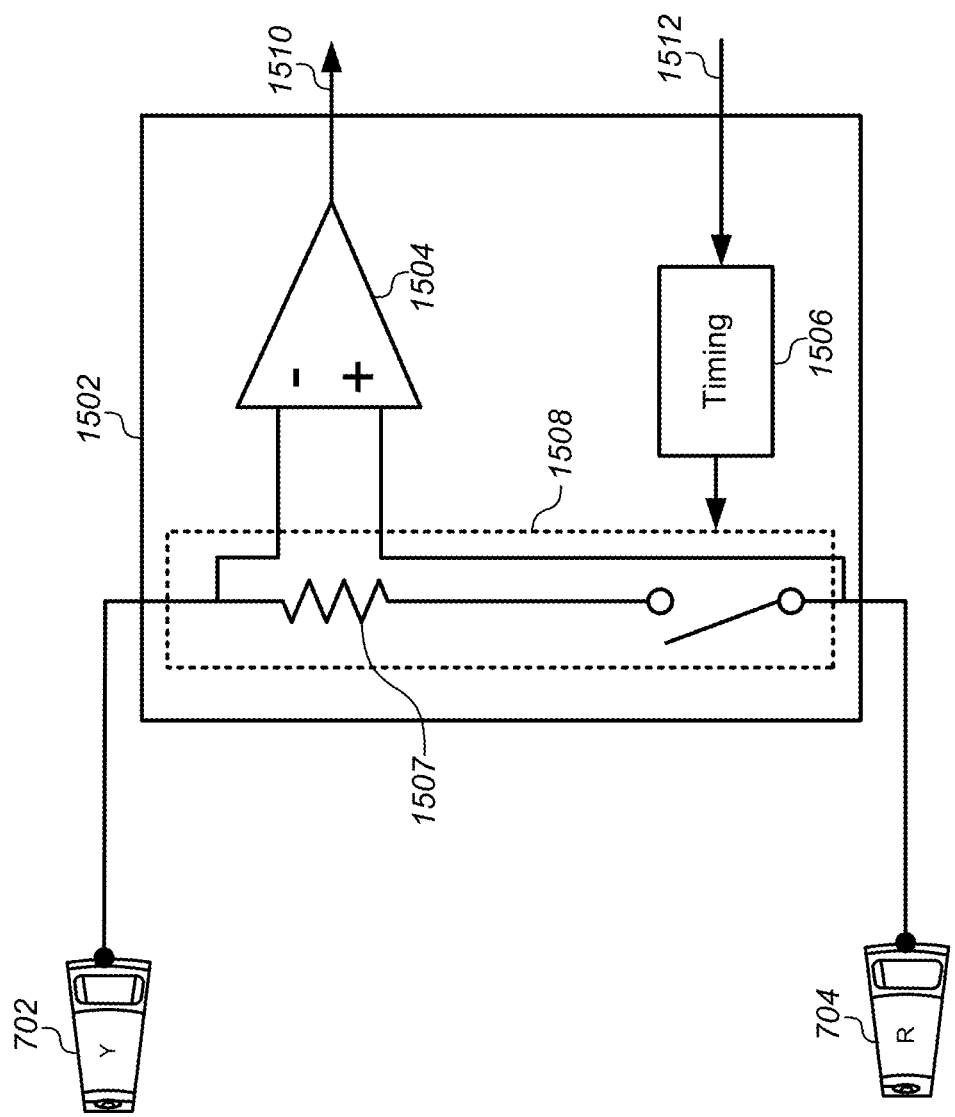
FIG. 15 illustrates a simplified version of a switch that may be used to connect/disconnect power wires connectors in a thermostat, according to some embodiments.

FIG. 15 illustrates a simplified version of a switch 1502 that may be used to connect/disconnect power wires connectors in a thermostat, according to some embodiments. The switch 1502 may be designed as a single integrated circuit, such as the solid-state relay switching integrated circuit (SSR-IC) described in detail in the commonly assigned U.S. Pat. No. 10,557,640, which is incorporated herein by reference. The switch 1502 may include one or more power FETs that act as the primary switching elements 1508 for connecting the Y wire connector 702 to the R wire connector 704. Similar switches may also be used to perform similar connections between other power and return wires connected to thermostat. Because power stealing is often most efficient using the air conditioning system for the reasons described above, this disclosure will use the connection between the Y wire connector 702 and the R wire connector 704 as an example. However, it will be understood that any other connection between power/return wires may be used in a similar manner.

The switch 1502 may be equipped with timing circuitry, electrical isolation circuitry, bus communication systems, telemetry circuitry, and other related subsystems. These circuits/subsystems are not illustrated in detail in FIG. 15 for the sake of clarity, but they are illustrated in detail in U.S. Pat. No. 10,557,640. The switch 1502 may include an input 1512 that causes an active power stealing cycle to begin. Timing circuitry 1506 may determine how long the switching elements 1508 should remain open. As described above, this may be based on a predetermined time interval and/or on a voltage measurement on the storage capacitor 622.

In addition to the timing circuitry 1506, the switch 1502 may include telemetry circuitry that measures voltage, current, temperature, and/or other electrical/environmental characteristics of the switch 1502 in real time. These measurements may be provided on outputs of the switch 1502, such as through a serial bus interface. In addition to being stored and provided to a cloud server for analysis, these measurements may also be leveraged for real-time use by the thermostat processor for controlling the power-stealing window. For example, a simple comparator 1504 may be used to measure the voltage across one or more of the switching elements 1508. In FIG. 15, one of the series switching elements is modeled as a resistance 1507 for clarity. The output of the comparator 1504 may be phase-aligned with the AC current passing through the switching element 1508 from the HVAC system. The resulting output of the comparator 1504 may generate a square wave that is phase aligned with the AC current, and the rising/falling edges of the square wave may indicate zero-crossing points of the AC current. The output of the comparator 1504 may be provided as a waveform on an output 1510 of the IC package of the switch 1502. In some embodiments, the comparator 1504 may be implemented using a discrete circuit outside of the switching circuit IC that may implement the rest of the switch 1502. The embodiments described herein may optimize active power-stealing cycles by using the zero-crossing output 1510 provided by the switch 1502 to provide an enable signal to the input 1512 that limits active power stealing to an optimal window.

Figure 16:
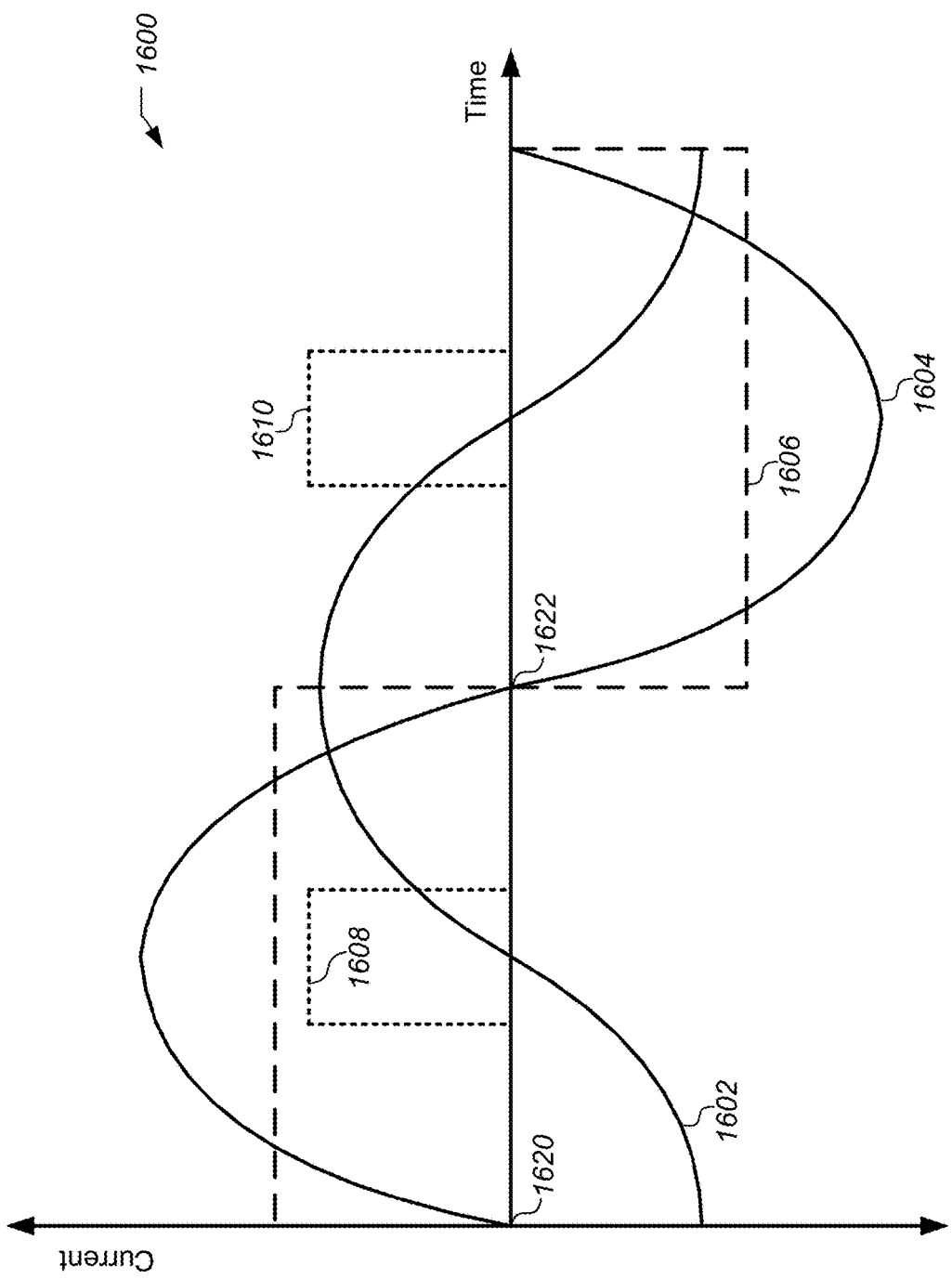
FIG. 16 illustrates a graph of waveforms present in the contactor of the air conditioning system and the switch of the thermostat, according to some embodiments.

FIG. 16 illustrates a graph 1600 of waveforms present in the contactor of the air conditioning system and the switch of the thermostat, according to some embodiments. First, the graph 1600 includes the operating coil current 1604 of the contactor. The operating coil current is an AC signal operating at edges such as approximately 50 Hz or approximately 60 Hz. For reference, the shading coil current 1602 is also illustrated as an AC current having the same frequency as the operating coil current 1604, but shifted 90° out of phase relative to the operating coil current 1604. The zero-crossing output 1510 provided by the switch 1502 described above is illustrated as a zero-crossing square wave 1606. Note that the vertical axis of the graph 1600 is illustrated in terms of a current measurement. However, the current of the vertical axis applies only to the operating coil current 1604 and the shading coil current 1602. The output of the zero-crossing square wave 1606 may be displayed in terms of voltage. However, these are shown on the same graph to emphasize the relative timing of the operating coil current 1604 and the zero-crossing square wave 1606.

Some embodiments may utilize the timing information provided by the zero-crossing square wave 1606 in order to time the active power-stealing window for the device. For example, some embodiments may start a timer when a zero crossing occurs. The timer may be configured to act as a delay between the zero-crossing event and the start of an active power-stealing window 1608. The length of the timer may be configured to start the active power-stealing window 1608 relative to a peak of the operating coil current 1604. In some embodiments, the active power-stealing window 1608 may be centered around a peak of the operating coil current 1604. In other embodiments, the active power-stealing window 1608 may be timed such that it is not necessarily centered around the peak of the operating coil current 1604, but instead is shifted to occur during a later portion of the half cycle of the operating coil current 1604. Alternatively, the active power-stealing window 1608 may be shifted to occur during a first portion of the half cycle of the operating coil current 1604.

This process for determining a start time for the active power-stealing window 1608 may be performed repeatedly with each zero crossing of the zero-crossing square wave 1606 received from the switch 1502. For example, when a first zero crossing 1620 is detected, a first timer may begin. At the expiration of the first timer, a first active power-stealing window 1608 may be initiated. The length of the first active power-stealing window 1608 may be determined by another, second timer operation, which may reuse the same timer or start a new timer. When this subsequent, second timer operation expires, the active power-stealing window 1608 may be terminated. When a second and subsequent zero crossing 1622 occurs, the same process may be repeated. For example, the timer may be restarted and a second active power-stealing window 1610 may be started at the second expiration of the first timer. Thus, each half cycle of the operating coil current 1604 may include a corresponding active power-stealing window.

Figure 17:
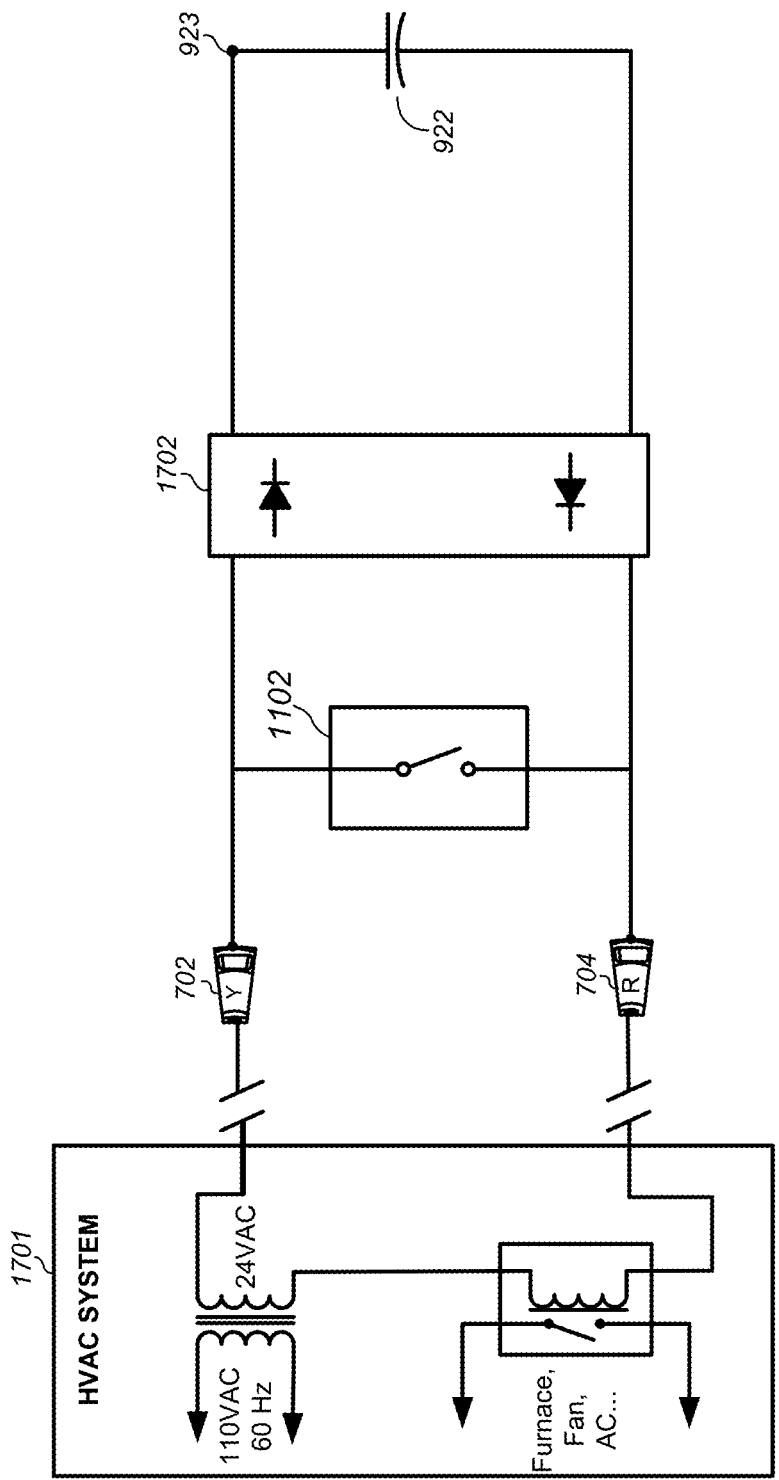
FIG. 17 illustrates a simplified block diagram that shows how the power efficiencies are gained by stealing power at the peaks of the operating coil current, according to some embodiments.

FIG. 17 illustrates a simplified block diagram that shows how the power efficiencies are gained by stealing power at the peaks of the operating coil current, according to some embodiments. The HVAC system 1701 shows a simplified version of the components described above for an HVAC system with an air conditioner unit. During the active power-stealing window, the instantaneous current passing through the coil of the HVAC system 1701 may appear to be similar to a DC current passing through an inductor. That instantaneous DC current may be passed into the thermostat through the circuit formed by the Y wire connector 702 and the R wire connector 704. When closed, the switch 1502 normally passes this current through the completed circuit to activate the HVAC function (e.g., turn on the air conditioner). However, when opening the switch 1502, the instantaneous current from the inductor of the HVAC system 1701 will instead pass through the diode rectification 1702 and dump all of the charge onto the storage capacitor 622. In short, the active power-stealing window causes the combination of the HVAC system 1701 and the power stealing circuitry to act as a boost converter, storing a large amount of charge on the capacitor 622 in a relatively short amount of time during alternating active power-stealing cycles where the switch 1502 turns on and off. As in a boost converter, the AC cycle of the current waveform ramps up the current in the inductor, then the switch 1502 opens and dumps that current into the capacitor 622. This allows the active power-stealing cycle to be much more efficient than simply timing the active power-stealing cycle based on the voltage of the capacitor 622 alone.

Figure 18:
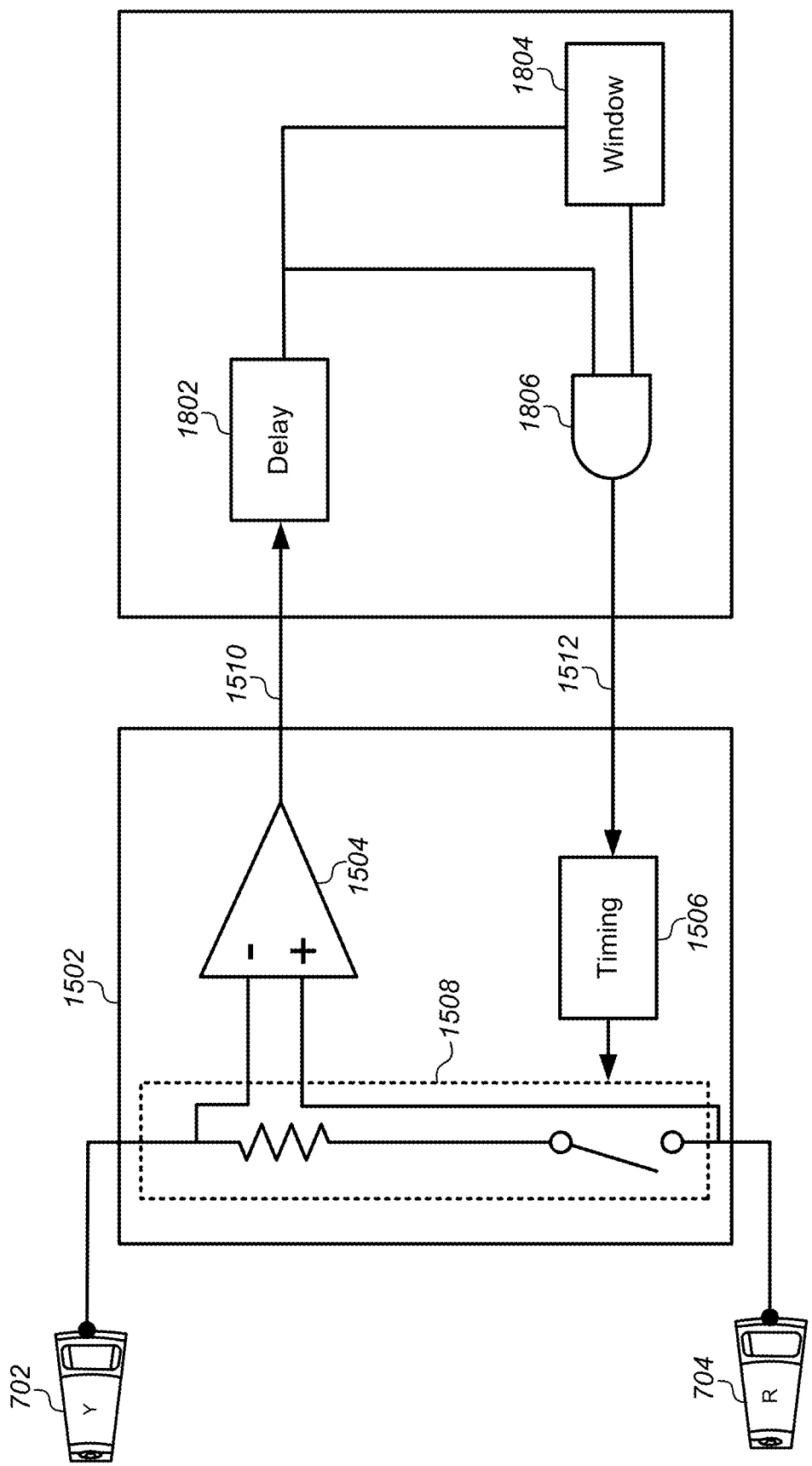
FIG. 18 illustrates a circuit diagram for processing the zero-crossing output and providing an enable signal for an active power-stealing window, according to some embodiments.

FIG. 18 illustrates a circuit diagram for processing the zero-crossing output 1510 and providing an enable signal for an active power-stealing window, according to some embodiments. The zero-crossing output 1510 may be provided to a delay function/circuit 1802. The delay function/circuit 1802 may be configured to generate a logic '1' a predetermined time interval after each zero crossing until the next zero crossing occurs. The delay function/circuit 1802 may act as a first timer that delays the beginning of the active power-stealing window after each zero crossing in order to time the active power-stealing window relative to a peak of the AC current. The output of the delay function/circuit 1802 may be passed to one input of an AND gate 1806.

In addition to passing the output of the delay function/circuit 1802 to the AND gate 1806, the output may also be provided to a window function/circuit 1804 that generates an output pulse that is the width of the desired active power-stealing window. The window function/circuit 1804 may act as a second timer that determines the length of the active power-stealing interval. The output of the window function/circuit 1804 may also be passed as a second input to the AND gate 1806. The output of the AND gate 1806 may be passed to the input 1512 of the switch 1502 to enable an active power-stealing operation. As described above, the timing circuitry 1506 may use the voltage on the storage capacitor and/or additional timers to determine when and how long each power stealing operation should be.

Each of the circuit elements that monitors and controls the operation of the switching elements 1508 may be referred to as a circuit that controls the one or more switching elements. In addition to the example explicitly shown in FIG. 18, other embodiments may use different circuit types for controlling the switching elements 1508. For example, some embodiments may use a microprocessor or microcontroller to control the timing for enabling active power stealing instead of using the discrete circuit elements 1802, 1804, 1806 illustrated in FIG. 18.

Figure 19:
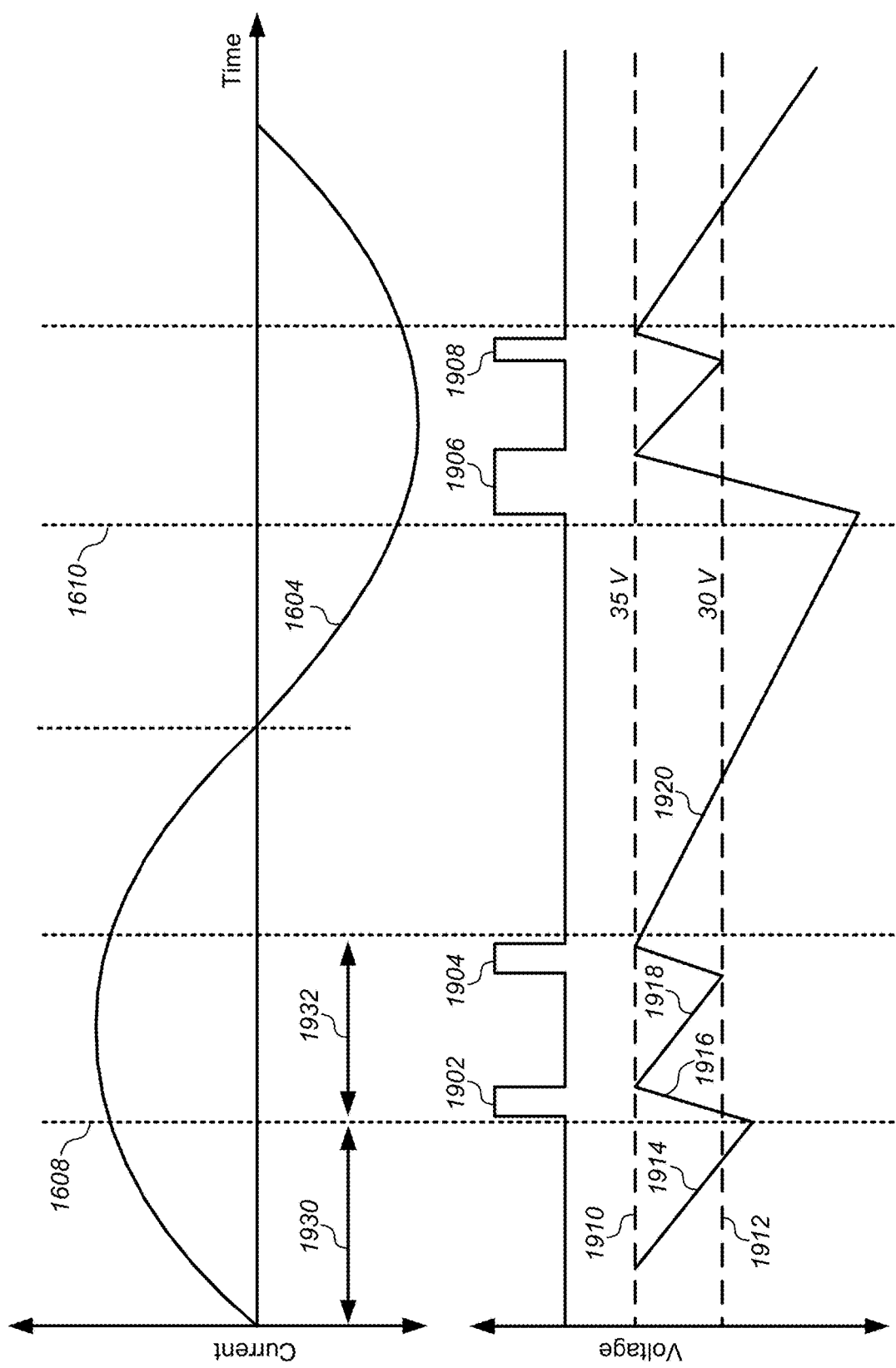
FIG. 19 illustrates a timing diagram for active power-stealing operations, according to some embodiments.

FIG. 19 illustrates a timing diagram for active power-stealing operations, according to some embodiments. It should be emphasized that the active power-stealing windows 1608, 1610 need not necessarily trigger the beginning of an active power-stealing operation. Instead, these active power-stealing windows 1608, 1610 may act as enable windows that indicate when active power-stealing operations may be carried out by the switch 1502. The top graph illustrates the operating coil current 1604 relative to the active power-stealing windows 1608, 1610. The bottom graph illustrates the actual active power-stealing operations 1902, 1904, 1906, 1908 that may occur when enabled during the active power-stealing windows 1608, 1610. The bottom graph also illustrates a voltage on the storage capacitor that decreases between active power-stealing operations and increases during active power-stealing operations.

The voltage 1914 on the capacitor may be decreasing prior to the first active power-stealing window 1608. This decrease may occur during normal operation of the thermostat as the charge on the storage capacitor is used to power the thermostat. Normally, when the voltage 1914 on the storage capacitor drops below a lower threshold 1912, and active power-stealing operation would immediately occur, charging the capacitor back to an upper voltage threshold 1910. Alternatively, the capacitor could be charged until a time limit expires prior to the voltage reaching the upper voltage threshold 1910 as described above. However, when using the active power-stealing windows 1608, 1610, the active power-stealing operation is not immediately invoked, even when the voltage 1914 on the capacitor drops below the lower voltage threshold 1912.

When the active power-stealing window 1608 begins, the switch 1502 may be provided with an enable signal. At that time, the switch 1502 may determine that the voltage 1914 has dropped below the lower voltage threshold 1912 and began an active power-stealing operation 1902. During the active power-stealing operation 1902, the voltage 1916 on the storage capacitor may increase rapidly until the upper voltage threshold 1910 is reached. This rapid charge may be achieved because the active power-stealing window 1608 occurs during a peak of the AC voltage cycle as described above. After the active power-stealing operation 1902 is completed, the voltage on the capacitor 1918 may gradually decrease through normal operation until the lower voltage threshold 1912 is again reached. At this point, a second active power-stealing operation 1904 may begin, so long as the active power-stealing operation 1904 occurs within the active power-stealing window 1608.

In some embodiments, the upper and lower voltage thresholds 1910, 1912 may have their thresholds increased from 3-8 V found in previous embodiments to approximately 30-40 V for embodiments using the active power-stealing windows 1608, 1610. For example, the lower voltage threshold 1912 may be set to approximately 30 V, and the upper voltage threshold 1910 may be set to approximately 35 V or 40 V. The number of active power-stealing operations 1902, 1904 that may occur during a single active power-stealing window 1608 need only be limited by the speed with which the switch 1502 can operate, the power consumption of the thermostat, and the values chosen for the upper voltage threshold 1910 and/or the lower voltage threshold 1912.

After the expiration of the active power-stealing enable window 1608, the voltage 1920 on the storage capacitor can again decrease during normal operation of the thermostat. Again, the voltage 1920 on the capacitor may decrease below the lower voltage threshold 1912. Note that the actual distance that the voltage 1920 falls below the lower voltage threshold 1910 depicted in FIG. 19 need not be to scale, and it is provided merely to illustrate how active power-stealing operations that would normally occur are now constrained to fall within the active power-stealing windows 1608, 1610. After a subsequent zero crossing, a new active power-stealing window 1610 may occur. At this point, new power-stealing operations 1906, 1908 may occur to boost the voltage on the capacitor back to the upper voltage threshold 1910.

While some embodiments may center the active power-stealing windows 1608, 1610 around the peak of the AC current cycle, other embodiments may instead delay the active power-stealing windows 1608, 1610 into a latter portion of the AC current cycle. It is been found that some air conditioning systems may be particularly sensitive, and delaying the beginning of the active power-stealing windows 1608, 1610 towards the end of the AC current cycle may minimize the risk that the power-stealing operations may cause chatter in the air conditioning unit.

Additionally, the length of the active power-stealing windows 1608, 1610 may be adjusted based on a number of factors. For example, some embodiments may monitor the system current of the thermostat. When the system current is higher than a threshold amount, the length of the active power-stealing windows 1608, 1610 may be increased. Alternatively, as the system current is lower than a threshold amount, the length of the active power-stealing windows 1608, 1610 may be decreased. Thus, the system power may be monitored in real time during operation of the thermostat, and the lengths of the active power-stealing windows 1608, 1610 may be increased/decreased dynamically to match decreases/increases in the operating current of the thermostat. For example, during a low-power interval for the thermostat, the first timer/delay 1930 may be approximately 5.5 ms, and the active power-stealing window 1608 may have a length 1932 of approximately 1 ms. As power increases above a threshold during a high-power interval for the thermostat, the first timer/delay 1930 may have a time of approximately 4 ms, and the active power-stealing window 1608 may have a length 1932 of approximately 2 ms.

Figure 20:
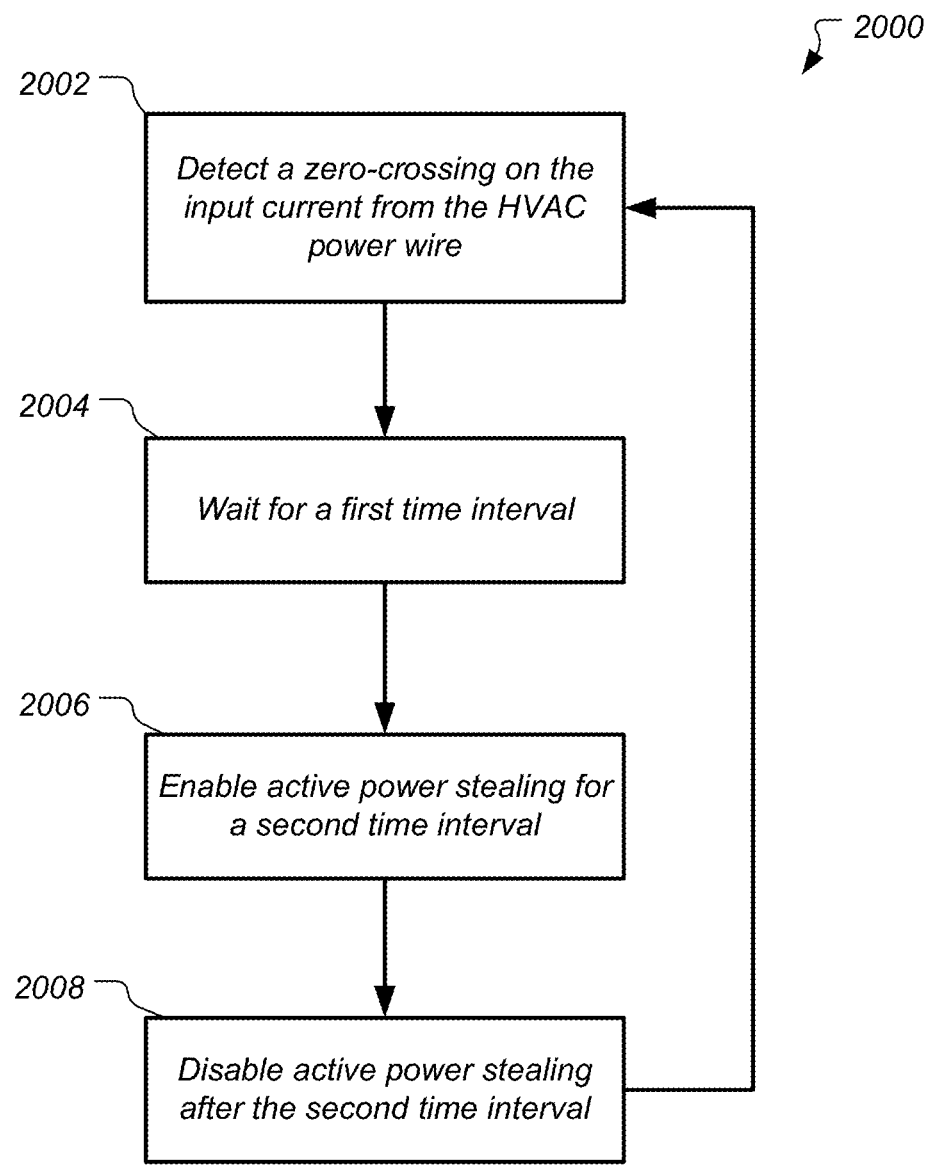
FIG. 20 illustrates a flowchart of a method for enabling active power-stealing operations, according to some embodiments.

FIG. 20 illustrates a flowchart 2000 of a method for enabling active power-stealing operations, according to some embodiments. The method may include detecting a zero crossing on the input current from an external environmental system (2002). The external environmental system may be an HVAC system that is controlled by a thermostat. The input current may be provided through power/return wire connectors of the thermostat. The zero-crossing on the input current may be detected by a solid-state switching IC that includes integrated telemetry measurements, such as voltage, current, and/or temperature for the internal switching elements (e.g., large FETs). In some embodiments, the zero-crossing may be represented by a square-wave output as illustrated and described above in FIGS. 15-17.

The method may also include waiting for a first time interval (2004). This first time interval may represent a delay between the zero crossing of the current AC cycle and the beginning of the active power-stealing window. The delay may be implement using a digital timer and/or discrete circuit elements that cause a delay relative to an input zero-crossing signal. In some embodiments, the first time interval may be between 2 ms and 6 ms. During the first time interval, the voltage on a storage capacitor may be allowed to decrease below a lower voltage threshold without triggering an active power-stealing operation.

The method may additionally include enabling active power stealing during a second time interval (2006). The second time interval may be represented by the active power-stealing windows described in the figures above. Enabling active power stealing does not necessarily require that active power-stealing operations occur. Instead, enabling active power stealing may allow active power-stealing operations to occur within the second time interval. One or more active power-stealing operations may occur within a single second time interval representing the active power-stealing window. The active power-stealing operations may charge the supply capacitor to a predetermined upper voltage threshold (e.g., 30-40 V) and/or may charge the supply capacitor until a charging time interval has expired. The active power-stealing window may be centered around a peak in the input AC current, or may alternatively be shifted towards a latter half of the AC current cycle.

The method may further include disabling active power stealing after the second time interval expires (2008). The expiration of the second time interval may represent the end of the active power-stealing window. Any ongoing active power-stealing operations may end immediately with the expiration of the second time interval. Alternatively, any ongoing active power-stealing operations may be allowed to terminate normally after the end of the second time interval. Generally, new active power-stealing operations may not be allowed to begin after the expiration of the second time interval until a new active power-stealing window begins. The power-stealing system may then again detect a subsequent zero-crossing on the input current from the HVAC power wire (2002) and cycle through this procedure repeatedly during active HVAC cycles.

The Smart-Home Environment

Figure 21:
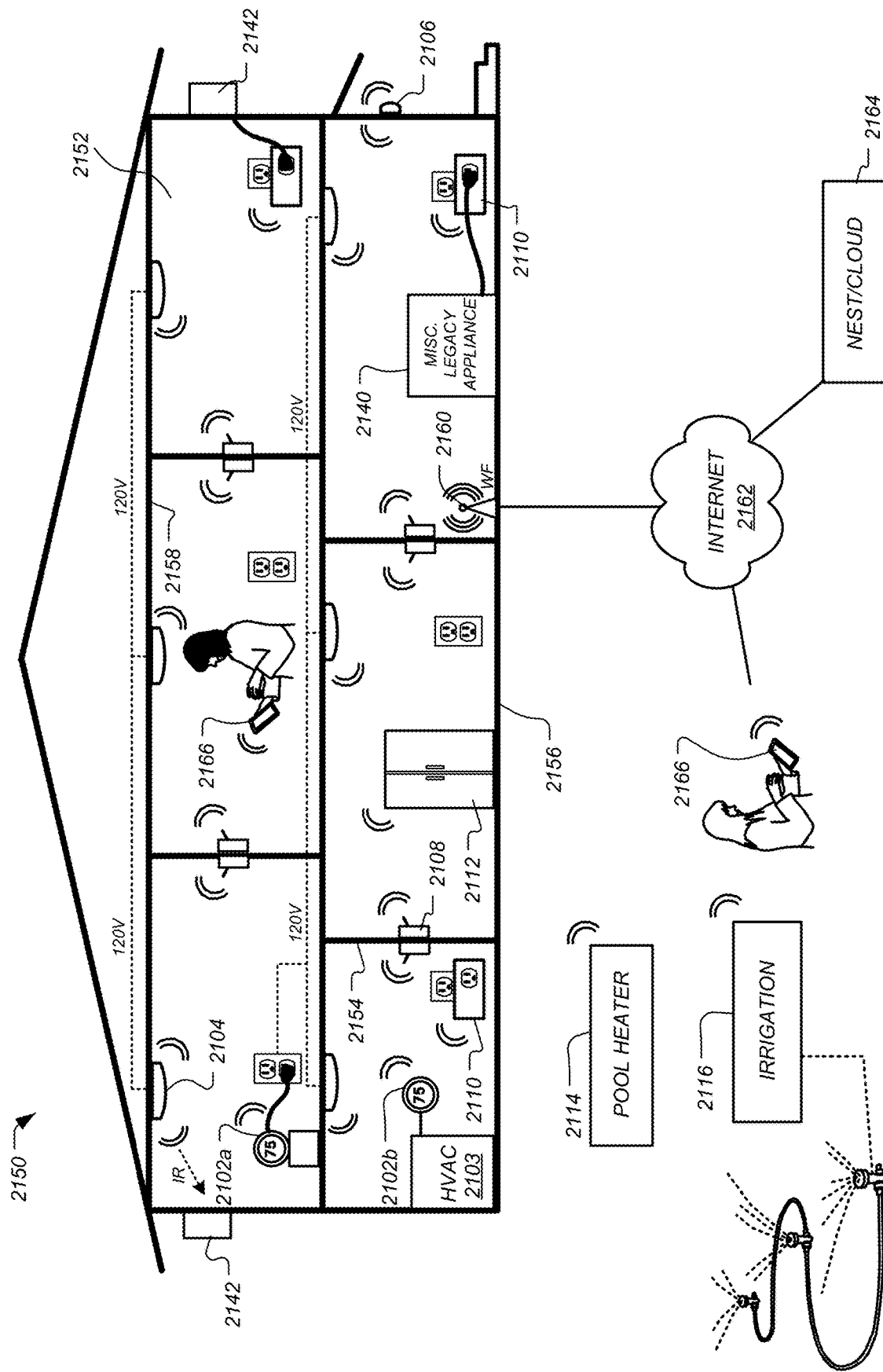
FIG. 21 illustrates an example of a smart home environment within which one or more of the devices, methods, systems, services, and/or computer program products described further herein can be applicable.

FIG. 21 illustrates an example of a smart home environment within which one or more of the devices, methods, systems, services, and/or computer program products described further herein can be applicable. The depicted smart home environment includes a structure 2150, which can include, e.g., a house, office building, garage, or mobile home. It will be appreciated that devices can also be integrated into a smart home environment that does not include an entire structure 2150, such as an apartment, condominium, or office space. Further, the smart home environment can control and/or be coupled to devices outside of the actual structure 2150. Indeed, several devices in the smart home environment need not physically be within the structure 2150 at all. For example, a device controlling a pool heater or irrigation system can be located outside of the structure 2150.

The depicted structure 2150 includes a plurality of rooms 2152, separated at least partly from each other via walls 2154. The walls 2154 can include interior walls or exterior walls. Each room can further include a floor 2156 and a walls. Devices can be mounted on, integrated with and/or supported by a wall 2154, floor or ceiling.

The smart home depicted in FIG. 21 includes a plurality of devices, including intelligent, multi-sensing, network-connected devices that can integrate seamlessly with each other and/or with cloud-based server systems to provide any of a variety of useful smart home objectives. One, more or each of the devices illustrated in the smart home environment and/or in the figure can include one or more sensors, a user interface, a power supply, a communications component, a modularity unit and intelligent software as described herein. Examples of devices are shown in FIG. 21.

An intelligent, multi-sensing, network-connected thermostat 2102 can detect ambient climate characteristics (e.g., temperature and/or humidity) and control a heating, ventilation and air-conditioning (HVAC) system 2103. One or more intelligent, network-connected, multi-sensing hazard detection units 2104 can detect the presence of a hazardous substance and/or a hazardous condition in the home environment (e.g., smoke, fire, or carbon monoxide). One or more intelligent, multi-sensing, network-connected entryway interface devices 2106, which can be termed a "smart doorbell", can detect a person's approach to or departure from a location, control audible functionality, announce a person's approach or departure via audio or visual means, or control settings on a security system (e.g., to activate or deactivate the security system).

Each of a plurality of intelligent, multi-sensing, network-connected wall light switches 2108 can detect ambient lighting conditions, detect room-occupancy states and control a power and/or dim state of one or more lights. In some instances, light switches 2108 can further or alternatively control a power state or speed of a fan, such as a ceiling fan. Each of a plurality of intelligent, multi-sensing, network-connected wall plug interfaces 2110 can detect occupancy of a room or enclosure and control supply of power to one or more wall plugs (e.g., such that power is not supplied to the plug if nobody is at home). The smart home may further include a plurality of intelligent, multi-sensing, network-connected appliances 2112, such as refrigerators, stoves and/or ovens, televisions, washers, dryers, lights (inside and/or outside the structure 2150), stereos, intercom systems, garage-door openers, floor fans, ceiling fans, whole-house fans, wall air conditioners, pool heaters 2114, irrigation systems 2116, security systems (including security system components such as cameras, motion detectors and window/door sensors), and so forth. While descriptions of FIG. 21 can identify specific sensors and functionalities associated with specific devices, it will be appreciated that any of a variety of sensors and functionalities (such as those described throughout the specification) can be integrated into the device.

In addition to containing processing and sensing capabilities, each of the devices 2102, 2104, 2106, 2108, 2110, 2112, 2114 and 2116 can be capable of data communications and information sharing with any other of the devices 2102, 2104, 2106, 2108, 2110, 2112, 2114 and 2116, as well as to any cloud server or any other device that is network-connected anywhere in the world. The devices can send and receive communications via any of a variety of custom or standard wireless protocols (Wi-Fi, ZigBee, 6LoWPAN, Thread, Bluetooth, BLE, HomeKit Accessory Protocol (HAP), Weave, etc.) and/or any of a variety of custom or standard wired protocols (CAT6 Ethernet, HomePlug, etc.). Each of the devices 2102, 2104, 2106, 2108, 2110, 2112, 2114 and 2116 may also be capable of receiving voice commands or other voice-based inputs from a user, such as the Google Home® interface. The wall plug interfaces 2110 can serve as wireless or wired repeaters, and/or can function as bridges between (i) devices plugged into AC outlets and communicating using Homeplug or other power line protocol, and (ii) devices that not plugged into AC outlets.

For example, a first device can communicate with a second device via a wireless router 2160. A device can further communicate with remote devices via a connection to a network, such as the Internet 2162. Through the Internet 2162, the device can communicate with a central server or a cloud-computing system 2164. The central server or cloud-computing system 2164 can be associated with a manufacturer, support entity or service provider associated with the device. For one embodiment, a user may be able to contact customer support using a device itself rather than needing to use other communication means such as a telephone or Internet-connected computer. Further, software updates can be automatically sent from the central server or cloud-computing system 2164 to devices (e.g., when available, when purchased, or at routine intervals).

By virtue of network connectivity, one or more of the smart-home devices of FIG. 21 can further allow a user to interact with the device even if the user is not proximate to the device. For example, a user can communicate with a device using a computer (e.g., a desktop computer, laptop computer, or tablet) or other portable electronic device (e.g., a smartphone). A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

The smart home also can include a variety of non-communicating legacy appliances 2140, such as old conventional washer/dryers, refrigerators, and the like which can be controlled, albeit coarsely (ON/OFF), by virtue of the wall plug interfaces 2110. The smart home can further include a variety of partially communicating legacy appliances 2142, such as IR-controlled wall air conditioners or other IR-controlled devices, which can be controlled by IR signals provided by the hazard detection units 2104 or the light switches 2108.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have beeen described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A smart-home device comprising:
   a battery or capacitor that stores energy that is harvested from an environmental system;
   a power wire connector and a return wire connector;
   one or more switching elements configured to operate in:
      a first operating state in which the one or more switching elements create a connection between the power wire connector and the return wire connector; and
      a second operating state in which the one or more switching elements interrupt the connection between the power wire connector and the return wire connector; and
   a circuit that controls the one or more switching elements, wherein the circuit is configured to:
      detect a zero-crossing of a current received through the power wire connector;
      wait for a first time interval after the zero-crossing is detected;
      after an expiration of the first time interval, enable active power stealing for a second time interval by allowing the one or more switching elements to transition from operating in the first operating state to the second operating state during the second time interval; and
      after an expiration of the second time interval, disable active power stealing.

2. The smart-home device of claim 1, wherein enabling active power stealing allows a power-stealing circuit to steal power from the environmental system at times that occurred during the second time interval.

3. The smart-home device of claim 2, wherein at least two different active power-stealing operations take place during the second time interval.

4. The smart-home device of claim 1, further comprising a storage capacitor that is charged to between approximately 30 V and approximately 40 V during power-stealing operations that take place during the second time interval.

5. The smart-home device of claim 1, wherein the second time interval is centered around a peak of the current received through the power wire connector.

6. The smart-home device of claim 1, wherein more of the second time interval occurs during a second half of a peak of the current received through the power wire connector than during a first half of the peak of the current received through the power wire connector.

7. The smart-home device of claim 1, wherein the first time interval is between 2 ms and 6 ms.

8. The smart-home device of claim 1, wherein the second time interval is between 1 ms and 6 ms.

9. The smart-home device of claim 1, wherein a length of the second time interval is determined based on an operating current of the smart-home device during the second time interval.

10. The smart-home device of claim 9, wherein the length of the second time interval is increased as the operating current of the smart-home device increases, and the length of the second time interval is decreased as the operating current of the smart-home device decreases.

11. The smart-home device of claim 1, wherein the circuit comprises a microprocessor.

12. The smart-home device of claim 1, wherein the circuit comprises a delay circuit and a windowing circuit.

13. The smart-home device of claim 1, wherein the circuit comprises a comparator comprising a first input and a second input that receive voltages before and after passing through the one or more switching elements.

14. A method for enabling active power-stealing operations in a smart-home device, the method comprising:
   detecting a zero-crossing of a current received through a power wire connector of the smart home device;
   waiting for a first time interval after the zero-crossing is detected;
   after an expiration of the first time interval, enabling active power stealing for a second time interval by allowing one or more switching elements to transition from operating in a first operating state to a second operating state during the second time interval, wherein:
      the first operating state creates a connection between the power wire connector and a return wire connector of the smart-home device; and
      the second operating state interrupts the connection between the power wire connector and the return wire connector; and
   disabling active power stealing after an expiration of the second time interval.

15. The method of claim 14, wherein the second time interval is centered around a peak of the current received through the power wire connector.

16. The method of claim 14, wherein more of the second time interval occurs during a second half of a peak of the current received through the power wire connector than during a first half of the peak of the current received through the power wire connector.

17. The method of claim 14, wherein the second time interval is between 1 ms and 6 ms.

18. The method of claim 14, wherein a length of the second time interval is determined based on an operating current of the smart-home device during the second time interval.

19. The method of claim 18, wherein the length of the second time interval is increased as the operating current of the smart-home device increases, and the length of the second time interval is decreased as the operating current of the smart-home device decreases.

20. The method of claim 14, wherein the smart-home device comprises a comparator comprising a first input and a second input that receive voltages before and after passing through the one or more switching elements.

* * * * *